US010802894B2

(12) United States Patent
Engler et al.

(10) Patent No.: US 10,802,894 B2
(45) Date of Patent: Oct. 13, 2020

(54) METHOD, APPARATUS, AND COMPUTER-READABLE MEDIUM FOR MANAGING NOTIFICATIONS DELIVERED TO A VIRTUAL REALITY DEVICE

(71) Applicant: Inflight VR Software GmbH, Munich (DE)

(72) Inventors: Moritz Engler, Buggingen (DE); Nikolas Jaeger, Munich (DE); Eleni Kokkinara, Barcelona (ES)

(73) Assignee: INFLIGHT VR SOFTWARE GMBH, Munich (DE)

( * ) Notice: Subject to any disclaimer, the term of this patent is extended or adjusted under 35 U.S.C. 154(b) by 82 days.

(21) Appl. No.: 15/941,970

(22) Filed: Mar. 30, 2018

(65) Prior Publication Data

US 2019/0303216 A1    Oct. 3, 2019

(51) Int. Cl.

| | | |
|---|---|---|
| *G06F 17/00* | (2019.01) | |
| *G06F 9/54* | (2006.01) | |
| *H04L 12/58* | (2006.01) | |
| *G06F 3/0482* | (2013.01) | |
| *G06F 3/01* | (2006.01) | |
| *G06F 3/0481* | (2013.01) | |
| *B64D 11/00* | (2006.01) | |
| *G06F 9/451* | (2018.01) | |

(52) U.S. Cl.
CPC .......... *G06F 9/542* (2013.01); *B64D 11/0015* (2013.01); *G06F 3/013* (2013.01); *G06F 3/0482* (2013.01); *G06F 3/04817* (2013.01); *G06F 9/451* (2018.02); *H04L 51/24* (2013.01); *G06F 2209/547* (2013.01)

(58) Field of Classification Search
CPC ....... G06F 3/011; G06F 3/04817; G06F 9/542
See application file for complete search history.

(56) References Cited

U.S. PATENT DOCUMENTS

| | | | |
|---|---|---|---|
| 8,806,543 B1 * | 8/2014 | Curtis .............. | B64D 11/00151 725/75 |
| 2002/0057284 A1 * | 5/2002 | Dalby ................. | G06Q 10/107 715/700 |

(Continued)

*Primary Examiner* — Andrew T McIntosh
(74) *Attorney, Agent, or Firm* — Amardeep S. Grewal; Reed Smith LLP

(57) ABSTRACT

A system, method, and computer-readable medium for managing notifications delivered to a Virtual Reality (VR) device, including receiving, by a middleware application executing on the VR device, a notification from a server, the notification comprising a notification identifier, transmitting, by the middleware application, the notification to a notification plugin integrated with an active application executing on the VR device, activating, by the notification plugin, a notification application on the VR device, the notification application being configured to disable all other applications on the VR device and to display a notification message corresponding to the notification identifier in the environment rendered by the VR device, and deactivating the notification application in response to one or more of: receiving, by the notification plugin, a second notification comprising a second notification identifier matching the notification identifier, or detecting, by the notification application, a user acknowledgement of the notification message.

21 Claims, 25 Drawing Sheets

(56) References Cited

U.S. PATENT DOCUMENTS

| | | | |
|---|---|---|---|
| 2010/0013629 A1* | 1/2010 | Sznaider | G08B 21/10 340/539.28 |
| 2012/0137124 A1* | 5/2012 | Curzi | H04L 63/0428 713/150 |
| 2016/0072907 A1* | 3/2016 | Papakipos | G06Q 10/10 709/217 |
| 2016/0124499 A1* | 5/2016 | Shiu | G06F 3/011 715/778 |
| 2016/0252957 A1* | 9/2016 | Raux | G06F 3/013 345/156 |
| 2017/0099592 A1* | 4/2017 | Loeb | H04L 67/303 |

* cited by examiner

METHOD, APPARATUS, AND COMPUTER-READABLE MEDIUM FOR MANAGING NOTIFICATIONS DELIVERED TO A VIRTUAL REALITY DEVICE

FIELD

The present invention relates to a method, an apparatus, and a computer-readable medium for managing notifications delivered to a virtual reality device.

BACKGROUND

Virtual Reality ("VR") is a computer-generated environment designed to immerse a user within a virtual location. VR systems commonly utilize eyewear, such as headsets or helmets that provide video and audio output directly to a user through an integrated display and speakers. VR systems commonly include other mechanisms designed to increase a user's sense of immersion, such as haptic feedback in headsets and accessories and accelerometers configured to detect headset motion and alter the virtual environment correspondingly.

The result of all of these features is that VR is a uniquely immersive medium. Consequently, VR devices that are used in potentially hazardous environments, such as airplanes, trains, or other forms of transportation must be carefully designed to maintain the user's immersion but at the same time allow the immersion to be effectively interrupted as necessary for emergencies, flight or trip notifications, or other administrator actions. Safety regulations, emergency warnings, space restrictions, and motion sickness are just a few of the many issues that need to be considered when developing a VR application for use in transportation.

Many current notification systems used in transportation, such as airplanes, lack the infrastructure and design to communicate with passenger VR media devices. For example, many airplanes utilize a cabled connection system to transmit alerts to passenger seat-back displays. Additionally, even in those systems that utilize more modern communication methods, such as wireless communications, to communicate with passenger media devices, the existing notification systems provide no flexibility in how notifications are triggered by crew members, received by devices, presented to passengers, and/or acknowledged and removed.

Consequently, there is a need for improvements in VR notification management and delivery technology.

SUMMARY

It is the object of the present invention to provide an improved or alternative method, system and computer-readable medium for managing notifications delivered to a Virtual Reality (VR) device.

This object is attained with a method, apparatus, and computer-readable medium according to the present specification or in line with the present claims.

The present invention relates to a method for managing notifications delivered to a Virtual Reality (VR) device. The method can comprise the steps as discussed below.

A receiving step by a middleware application executing on the VR device, a notification from a server. Middleware comprises computer software that interfaces with an external server, such as a VR content and/or notifications server, as well as with software applications running on the VR device, and provides services and instructions to VR software applications beyond those available from an operating system.

The notification can comprise a notification identifier. As a further step transmitting takes place, by the middleware application. The notification can be transmitted to a notification plugin integrated with an active application executing on the VR device and currently displayed in an environment rendered by the VR device.

Moreover, there can be the step of an activating, by the notification plugin, a notification application on the VR device. The notification application can be configured to disable all other applications on the VR device and to display a notification message corresponding to the notification identifier in the environment rendered by the VR device.

Additionally a deactivating the notification application can be performed in response to one or more of: receiving, by the notification plugin, a second notification comprising a second notification identifier matching the notification identifier, or detecting, by the notification application, a user acknowledgement of the notification message.

Transmitting, by the middleware application, the notification to a notification plugin integrated with an active application executing on the VR device and currently displayed on a display of the VR device can comprise: storing, by the middleware application, a notification status corresponding to the notification; transmitting, by the middleware application, the notification to the notification plugin integrated with the active application; receiving, by the middleware application, an acknowledgement from the notification plugin integrated with active application in response to receipt of the notification; and updating, by the middleware application, the notification status.

The notification can comprise either a persistent notification or a non-persistent notification and wherein activating, by the notification plugin, a notification application on the VR device comprises either: activating the notification application in a persistent mode when the notification comprises a persistent notification, wherein the persistent mode of the notification application is configured to deactivate upon the notification plugin receiving a second persistent notification comprising a second notification identifier matching the notification identifier; and/or activating the notification application in a non-persistent mode when the notification comprises a non-persistent notification, wherein the non-persistent mode of the notification application is configured to deactivate upon detecting a user acknowledgement of the notification message.

Detecting, by the notification application, a user acknowledgement of the notification message can comprise the steps of: transmitting, by the notification application, an acknowledgment message at an acknowledgment location within the environment rendered by the VR device; and detecting, by the notification application, that a gaze location of the user wearing the VR device corresponds to the acknowledgment location.

The notification can correspond to an intrusiveness level and/or displaying a notification message corresponding to the notification identifier in the environment rendered by the VR device can comprise the further step of: identifying one or more settings corresponding to the intrusiveness level; and rendering the notification message in the environment based at least in part on the one or more settings.

The method can further comprise the step of: executing, on the VR device, a toolbar application, the toolbar application being accessible to the notification plugin and being configured to transmit a persistent user interface element in the environment rendered by the VR device, the persistent user interface element comprising one or more of a seatbelt icon, an assistance icon, a meal icon, a lavatory icon, and a purchase icon.

The persistent user interface element can comprise an assistance icon and can further comprise: detecting, by the notification plugin, that a gaze location of the user wearing the VR device corresponds to a location of the assistance icon; generating, by the notification plugin, an assistance request, the assistance request comprising a device identifier of the VR device; transmitting, by the notification plugin, the assistance request to the middleware application; and/or transmitting, by the middleware application, the assistance request to the server, the assistance request being configured to cause the server to identify a seat corresponding to the device identifier, identify a crew member corresponding to the identified seat, and transmit the assistance request to a crew member computing device associated with the crew member.

The method can further comprise: transmitting, by the notification plugin, one or more commands to the toolbar application based at least in part on the notification, the one or more commands being configured to alter one or more display characteristics of an icon in the persistent user interface element.

The present invention additionally relates to a Virtual Reality (VR) device apparatus for managing notifications. The VR device apparatus can comprise one or more processors and one or more memories operatively coupled to at least one of the one or more processors and having instructions stored thereon that, when executed by at least one of the one or more processors, cause at least one of the one or more processors to perform one or more of the above-mentioned method steps.

The present invention additionally relates to at least one non-transitory computer-readable medium storing computer-readable instructions that, when executed a Virtual Reality (VR) device, cause the VR device to perform one or more of the above-mentioned method steps.

The method, apparatus, and computer-readable medium of the notification delivery and management system disclosed herein can provide an effective and instant notification delivery system for delivery of notifications to VR device users in flight. The middleware can be considered to provide a safer and more intermediate structure not affecting the operating system that also enables interconnectivity between the software running on the VR device and the VR server that delivers notifications to the VR device.

The method, apparatus, and computer-readable medium of the notification delivery and management system disclosed herein can enable safe use of virtual reality in potentially hazardous environments and can provide administrators and crew members with efficient and customizable delivery mechanisms for various types of notifications.

The method, apparatus, and computer-readable medium of the notification delivery and management system disclosed herein can also prevent passengers from losing their situational awareness in VR and not responding to notifications, such as calls for fastening their seat belts, passenger announcements from the pilot and crew, meal and drinks distribution, and severe emergency situations.

The method, apparatus, and computer-readable medium of the notification delivery and management system disclosed herein can additionally enable the crew to communicate certain instructions to all passengers' and have all passengers' attention as fast as possible.

An additional benefit that is conferred by method, apparatus, and computer-readable medium of the notification delivery and management system disclosed herein is that the notification messages can be customized or enhanced due to the VR environment—in particular, sensory feedback on the messages can be enhanced, extra notifications can be pushed (e.g. food), and emergency situations can be communicated and handled effectively.

DETAILED DESCRIPTION

While methods, apparatuses, and computer-readable media are described herein by way of examples and embodiments, those skilled in the art recognize that methods, apparatuses, and computer-readable media managing notifications delivered to a virtual reality device are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "can" is used in a permissive sense (i.e., meaning having the potential to) rather than the mandatory sense (i.e., meaning must). Similarly, the words "include," "including," and "includes" mean including, but not limited to.

As described above, VR has the power to deeply immerse users into rendered environments. As a result, passengers can easily lose their situational awareness and thus might not respond to calls for fastening their seat belts, ignore passenger announcements from the pilot and crew, miss the meal and drinks distribution, and might not recognize severe emergency situations that are arising. Especially in the case of an emergency situation, the crew needs to communicate certain instructions to all passengers' and have everyone's attention as fast as possible. Therefore, when announcements need to be communicated to passengers immersed in VR it is necessary to take special care: sensory feedback on the messages needs to be enhanced, extra notifications need to be pushed (e.g. food) and emergency situations need to be communicated and handled effectively.

Applicant has discovered a method, apparatus, and computer-readable medium that solves the existing problems in notification systems and has discovered a notification delivery and management system that enables safe use of virtual reality in potentially hazardous environments and that provides administrators and crew members with efficient and customizable delivery mechanisms for various types of notifications. The methods and systems for managing notifications delivered to Virtual Reality (VR) device are described in the context flight-based VR systems, but it is understood that the VR notification management and delivery system disclosed herein is applicable to any VR environment in which notifications are required to be delivered to users.

Figure 1:
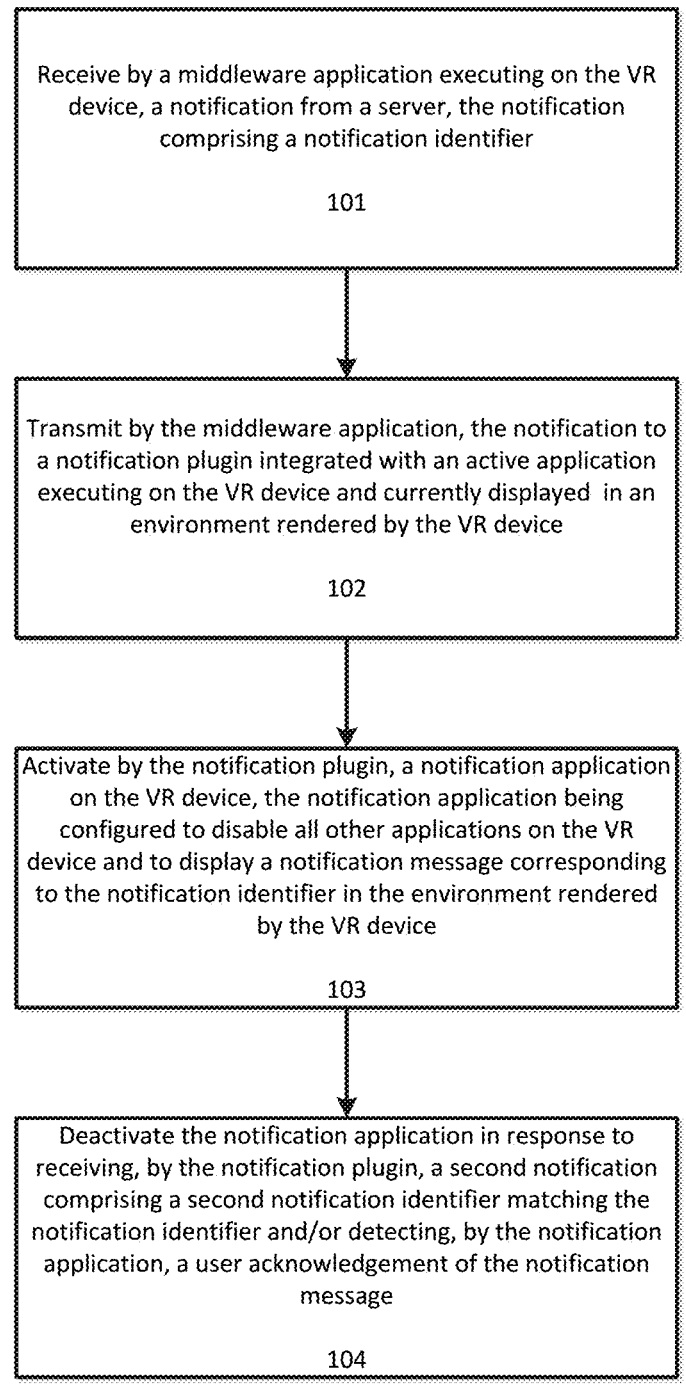
FIG. 1 illustrates a flowchart for managing notifications delivered to a Virtual Reality (VR) device according to an exemplary embodiment.

FIG. 1 illustrates a flowchart for managing notifications delivered to a Virtual Reality (VR) device according to an exemplary embodiment. At step 101 a notification from a server is received by a middleware application executing on the VR device, the notification comprising at least a notification identifier.

Figure 2:
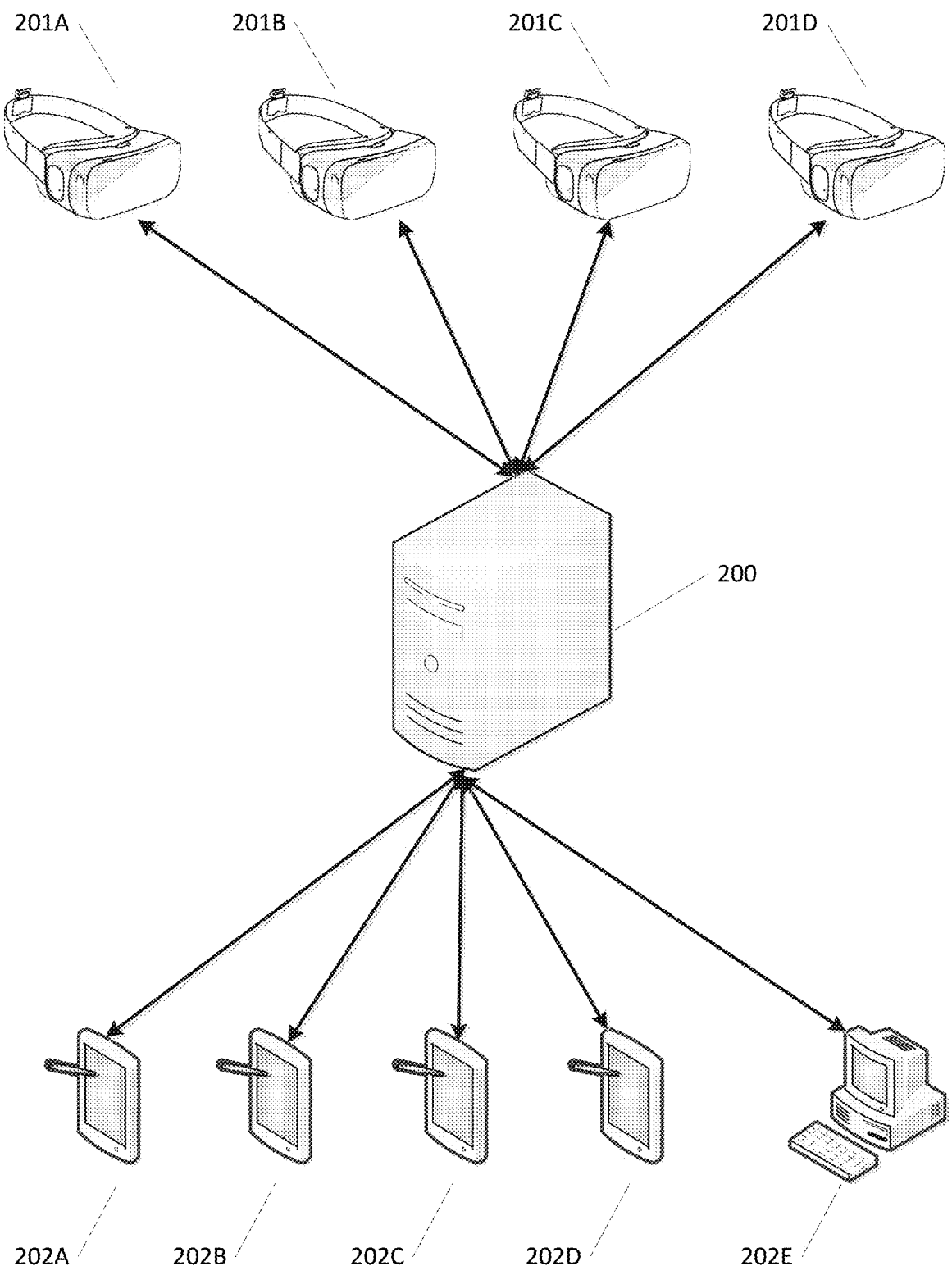
FIG. 2 illustrates the network architecture of the VR notification system according to an exemplary embodiment.

The VR device can be one of many devices being utilized by passengers in flight, as shown in FIG. 2. FIG. 2 illustrates the network architecture of the VR notification system according to an exemplary embodiment. Server 200 delivers notifications to connected VR devices 201A, 201B, 201C, and 201D. The server 200 and the VR devices 201A-201D can be connected over a wireless network or wired network and can communicate using any appropriate network protocols and software. For example, the server 200 and VR devices 201A-201D can communicate using the Web Socket technology in order to facilitate real-time communications between the two devices. When the server 200 is also a content server, this type of connection can be used to stream content from the server to the VR device, as required. The server 200 and VR devices 201A-201D can additionally communicate using a REST API. For example, REST can be used to communicate queries from the VR devices 201A-201D to server 200.

FIG. 2 also illustrates a plurality of administrator devices 202A-202E that are connected to the server 200 and that are responsible for originating notification messages. The network connection can be over a wireless network or wired network and can communicate using any appropriate network protocols and software, as discussed above. In the flight context, the administrator devices can be, for example, crew member devices. The administrator devices can be mobile devices, as shown by devices 202A-202D. Mobile devices include smart phones, tablets, smart watches and/or custom electronic devices (such as devices created by or for a specific airline). The administrator devices can also be larger computing devices, as shown by device 202E. Larger computing devices can include desktop computers, laptop computers, legacy systems (such as existing flight notification computers or avionics servers), or any other computing device.

As shown in FIG. 2, both administrator devices 202A-202E and VR devices 201A-201D have bidirectional communication with the server. This allows notifications to be sent from administrator devices through the server to the VR devices, and also allows for acknowledgements, status information, and requests to be routed from the VR devices, through the server, to the appropriate administrator devices.

Returning to FIG. 1, at step 102 the middleware application transmits the notification to a notification plugin (referred to herein as "notification plugin" or "plugin") integrated with an active application executing on the VR device and currently displayed in an environment rendered by the VR device. An example of steps 101 and 102 is shown in FIG. 3.

Figure 3:
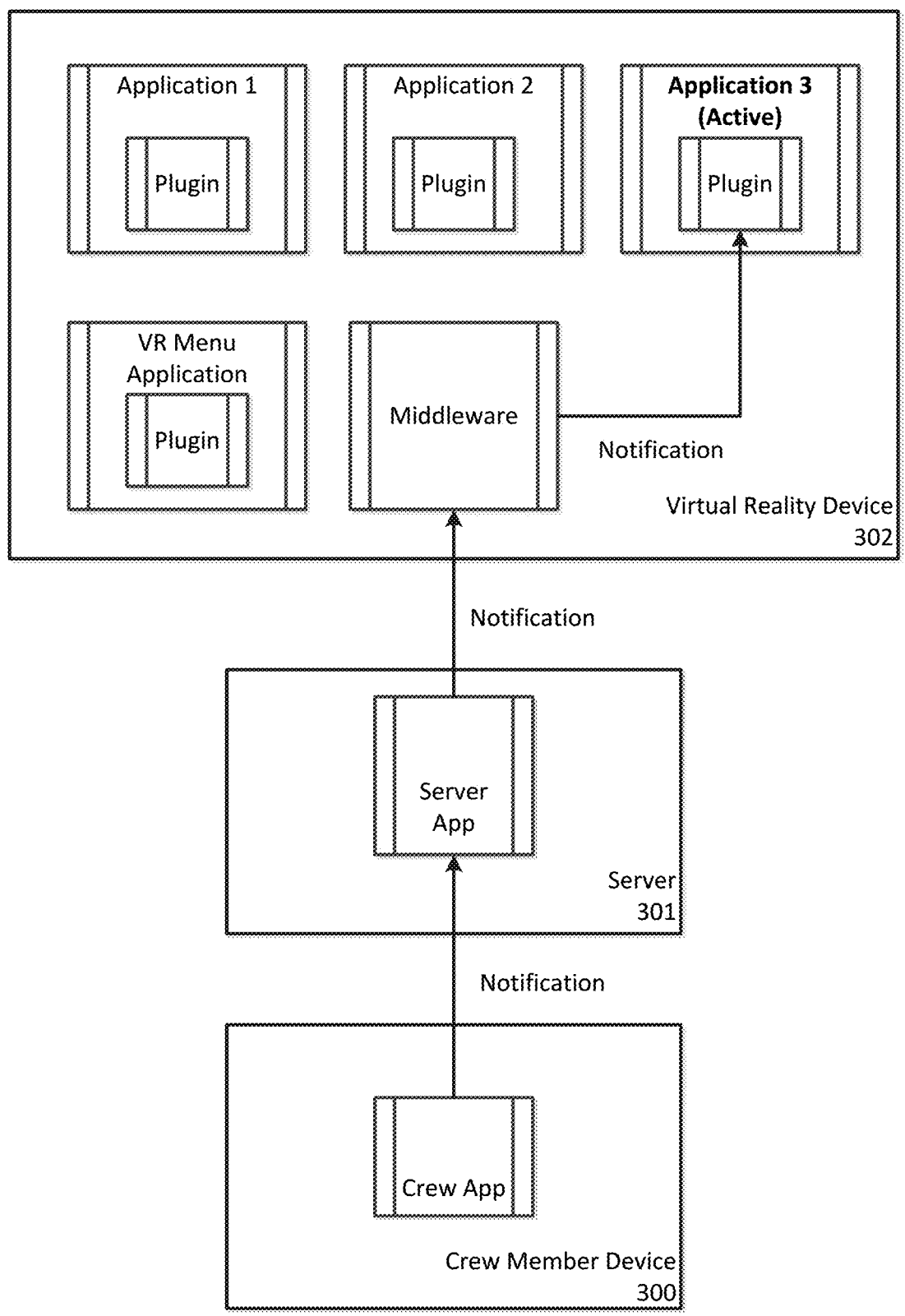
FIG. 3 illustrates the delivery of a notification from a crew member device to an application running on a VR device according to an exemplary embodiment.

FIG. 3 illustrates the delivery of a notification from a crew member device to an application running on a VR device according to an exemplary embodiment. Crew member device 300 can include a crew application that is used by crew members to generate and transmit notifications. The crew application can also enable monitoring of particular VR devices within the network, as discussed further below.

Server 301 runs a server application that is configured to interface with the crew application. As shown in the figure, the server app on the server 301 receives a notification from the crew app on the crew member device 300. The server 301 then transmit the notification to a middleware component on the virtual reality device 302. Note that the transmission of the notification to the middleware component can be either a push or a pull communication. The server (and server app) can be configured to automatically forward all notifications to VR devices. Alternatively, the middleware on the VR device can be configured to query the server for any notification updates. This querying can occur, for example, periodically, or in response to a specific event, such as the VR device launching a new application. Many variations are possible and these examples are not intended to be limiting.

The middleware application ("middleware") can be a service running in the background of the VR device 302 as a daemon. This allows the middleware to serve as dynamic notification delivery system to any currently running VR application on the VR device 302. The middleware serves as the interface between the VR device and the Server, and also serves as the interface to the specific applications running on the VR device.

The mechanism by which the middleware communicates with the applications running on the VR device 302 is a notification plugin integrated into each of the applications running on the VR device. The notification plugin can include a Software Development Kit (SDK) that third-party developers integrate into their applications to ensure that all applications are compatible the notification system and the middleware in particular. Therefore, the notification plugin is integrated into all applications running on the VR device 302, enabling the middleware to communicate with all applications on the VR device 302.

As shown in FIG. 3, Application 3 is the active application, meaning that it is the application that is on top of the OS stack and the application that is currently displayed in the virtual environment rendered by the VR device. Of course, when multiple applications are concurrently displayed, the active application is the application that has been selected. Since Application 3 is the active application, the notification received by the middleware is then sent to the notification plugin integrated with Application 3.

The middleware can be configured to automatically forward all notifications to the notification plugins integrated in the VR applications. Additionally, the notification plugins of the applications can also be configured to query or request the latest notifications from the middleware. The query or request can occur, for example, periodically, or in response to a specific event, such as the VR device launching a new application or switching between applications. For example, whenever the active application changes, the new active application can be configured to transmit a request to the middleware for any undelivered notifications. The middleware can also detect which application is the active application (for example, by interacting with the OS) and forward any notifications to the current active application when they are received.

Figure 4:
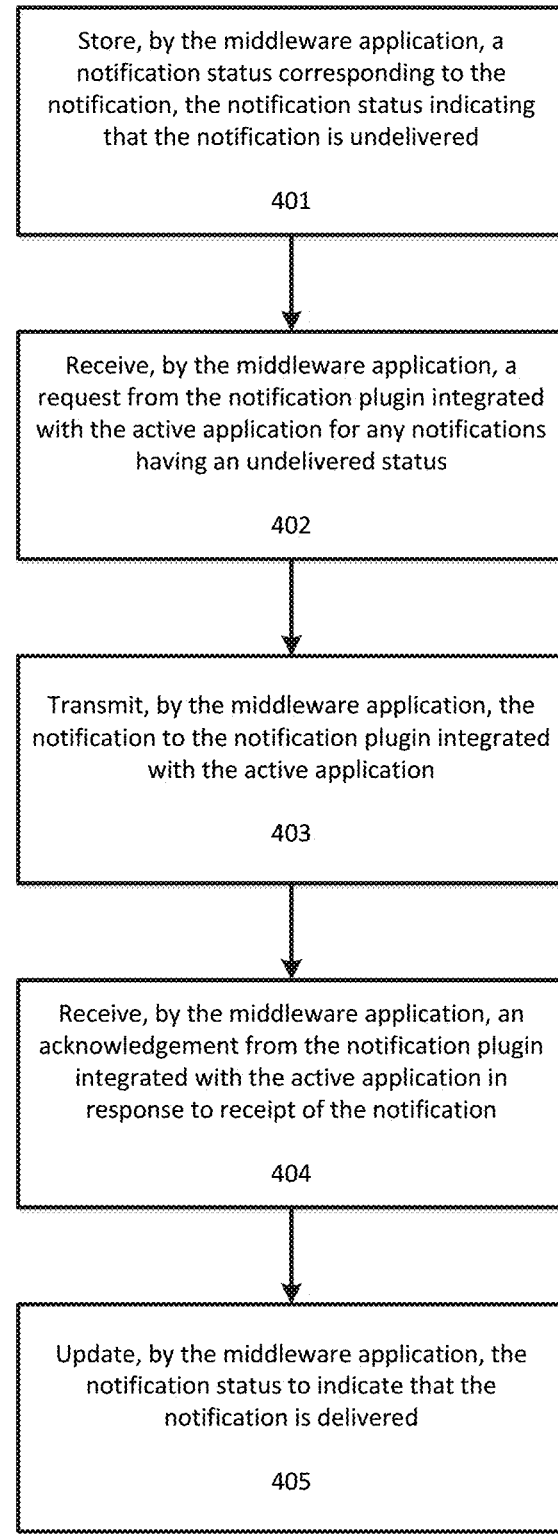
FIG. 4 illustrates a flowchart for transmitting, by the middleware application, the notification to a notification plugin integrated with an active application executing on the VR device and currently displayed on a display of the VR device according to an exemplary embodiment.

FIG. 4 illustrates a flowchart for transmitting, by the middleware application, the notification to a notification plugin integrated with an active application executing on the VR device and currently displayed on a display of the VR device according to an exemplary embodiment.

At step 401 the middleware application stores a notification status corresponding to a received notification. The notification status can indicate that the notification is undelivered. The middleware can also store the notification itself or some identifier of the notification that can be used to retrieve the information corresponding to that notification. The notification status can also indicate whether a particular notification is active or not active (i.e., "on" or "off").

Figure 5:
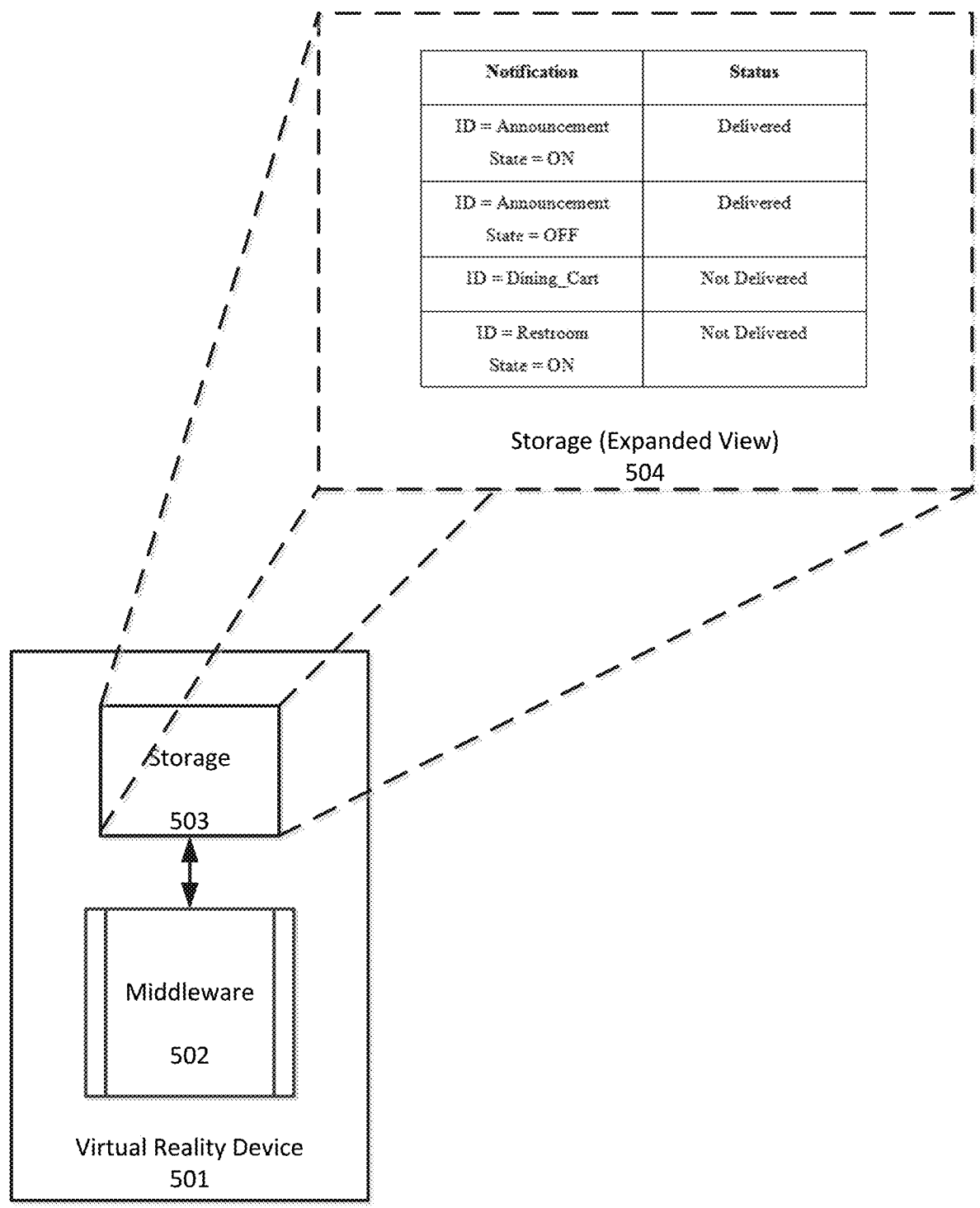
FIG. 5 illustrates the storage of notification information by a middleware application according to an exemplary embodiment.

FIG. 5 illustrates the storage of notification information by a middleware application according to an exemplary embodiment. As shown in FIG. 5 the VR device 501 includes middleware 502 and storage 503 that is accessible to middleware. Storage can also be part of the middleware, such as in the form of a cache accessible to middleware. FIG. 5 also shows an expanded view of storage 504 that includes a table storing notifications and their corresponding status. As shown in expanded view of storage 504, a notification identifier is stored for each notification, along with the status (delivered or not delivered). Of course, the storage and table can include any additional attributes or characteristics of the notification, discussed further below with reference to FIG. 15.

There are many possible techniques that can be used for storing notification status. For example, for notifications that have two states (such as "on" or "off"), the state of each notification can be stored in storage, rather than storing whether the notification is delivered or not delivered.

As an alternative to storing statuses of each notification, the middleware can be configured to store only notifications that are undelivered, making the notification status implicit. In this case, any notifications that are transmitted successfully (meaning an acknowledgement is received from the destination notification plugin), can be deleted from storage, leaving only undelivered notifications. Many variations are possible and these examples are not intended to be limiting.

Returning to FIG. 4, at step 402 the middleware receives a request from the notification plugin integrated with active application for any notifications having an undelivered status. As discussed above, this request can be transmitted periodically, or in response to some event, such as the launching of the active application. Alternatively, the request can also be a request for any notifications having an active or "On" status.

At step 403 the middleware transmits the notification to the notification plugin integrated with the active application. In response to the notification, the notification plugin of the active application transmits an acknowledgement back to the middleware, which is received by the middleware at step 404. Then, at step 405, the notification status of the notification is updated to indicate that the notification was delivered. When the notification status is implicit with the storage of the notification, this updating can include deleting the notification from storage.

Figure 6:
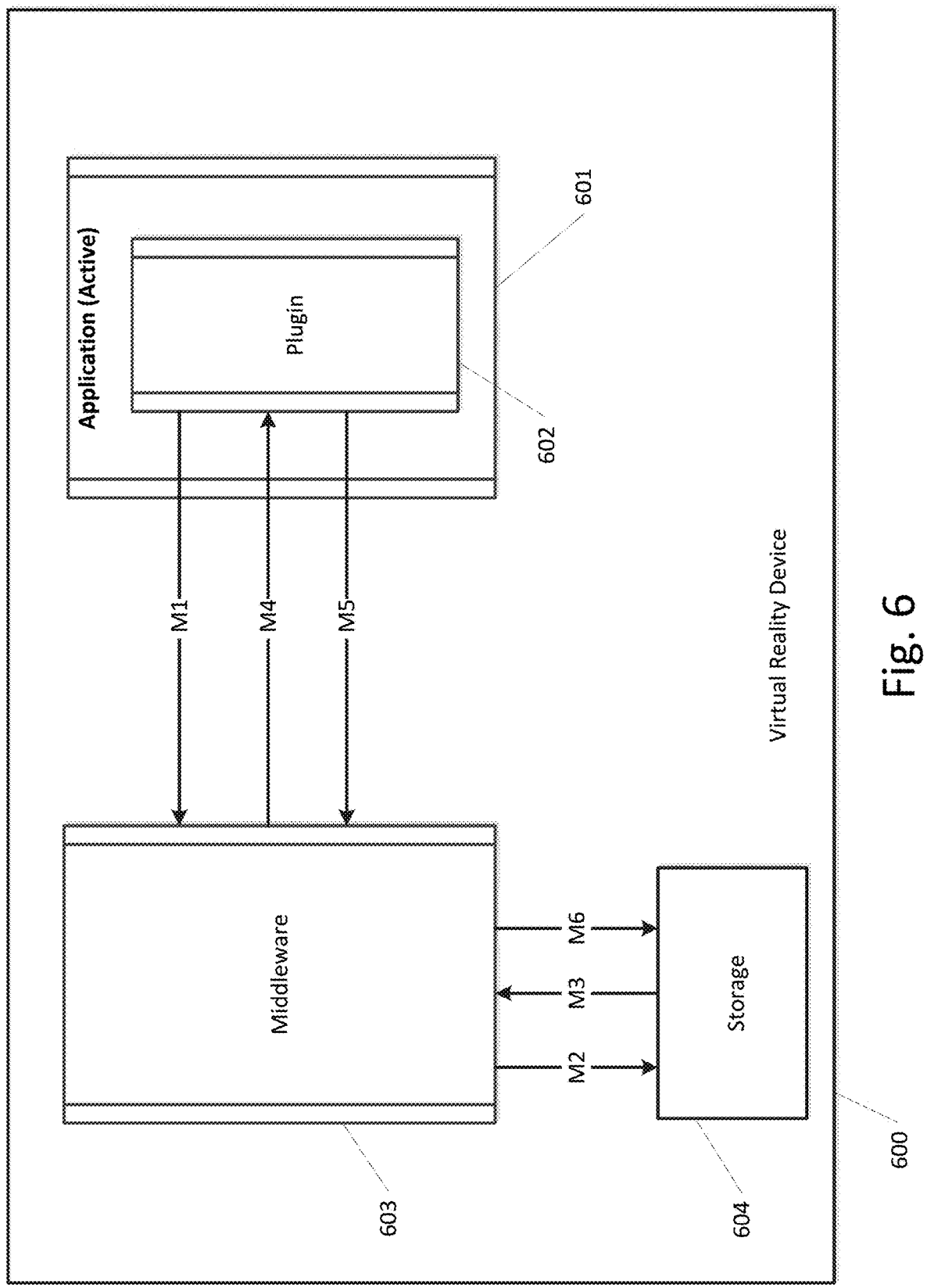
FIG. 6 illustrates a software message diagram corresponding to the process described in FIG. 4 according to an exemplary embodiment.

FIG. 6 illustrates a software message diagram corresponding to the process described in FIG. 4 according to an exemplary embodiment. As shown in FIG. 6, the VR device 600 includes at least application 601, including notification plugin 602, middleware 603, and storage 604.

Middleware 603 receives request message M1 from notification plugin 602 requesting any undelivered notifications. Middleware 603 then queries storage 604 with query message M2. In response to the query, storage 604 sends any undelivered notifications to middleware 603 in message M3. Middleware 603 then sends these undelivered notifications to plugin 602 in message M4. In response to receiving the notifications, notification plugin 602 transmits an acknowledgement to middleware 603 in message M5. Having received the acknowledgement, middleware then transmits message M6 to storage 604 to change the status of the delivered messages from undelivered to delivered. Message M6 can also be a deletion message requesting that storage 604 delete the delivered messages. Additionally, it is not shown in FIG. 6, but the middleware can further transmit acknowledgement M5 back to server, to allow server to update its own notification status information.

Returning to FIG. 1, at step 103 the notification plugin activates a notification application on the VR device. The application is configured to disable all other applications on the VR device and to display a notification message corresponding to the notification identifier in the environment rendered by the VR device.

Activating the notification application can include launching the notification application. Alternatively, the notification application can already be running on the VR device and activating can include bringing the notification application to the forefront of the user interface of the VR device. For example, activating can include passing some command to the notification application that switches it from a sleep or idle mode to an active mode.

Additionally, the notification message displayed in the environment rendered by the VR device can be loaded in a variety of ways. The notification message can be transmitted as part of the notification that is transmitted to the notification plugin. The notification message can also be loaded by either the notification plugin or the notification application using an identifier, such as a notification identifier, that is transmitted as part of the notification. In this case, a table or other data storage structure can be maintained in the memory of the VR device that stores the correspondence between notification identifiers and one or more other attributes (such as notification message). The table or data storage structure can also store notification status of messages sent to the middleware by the server.

Figure 7:
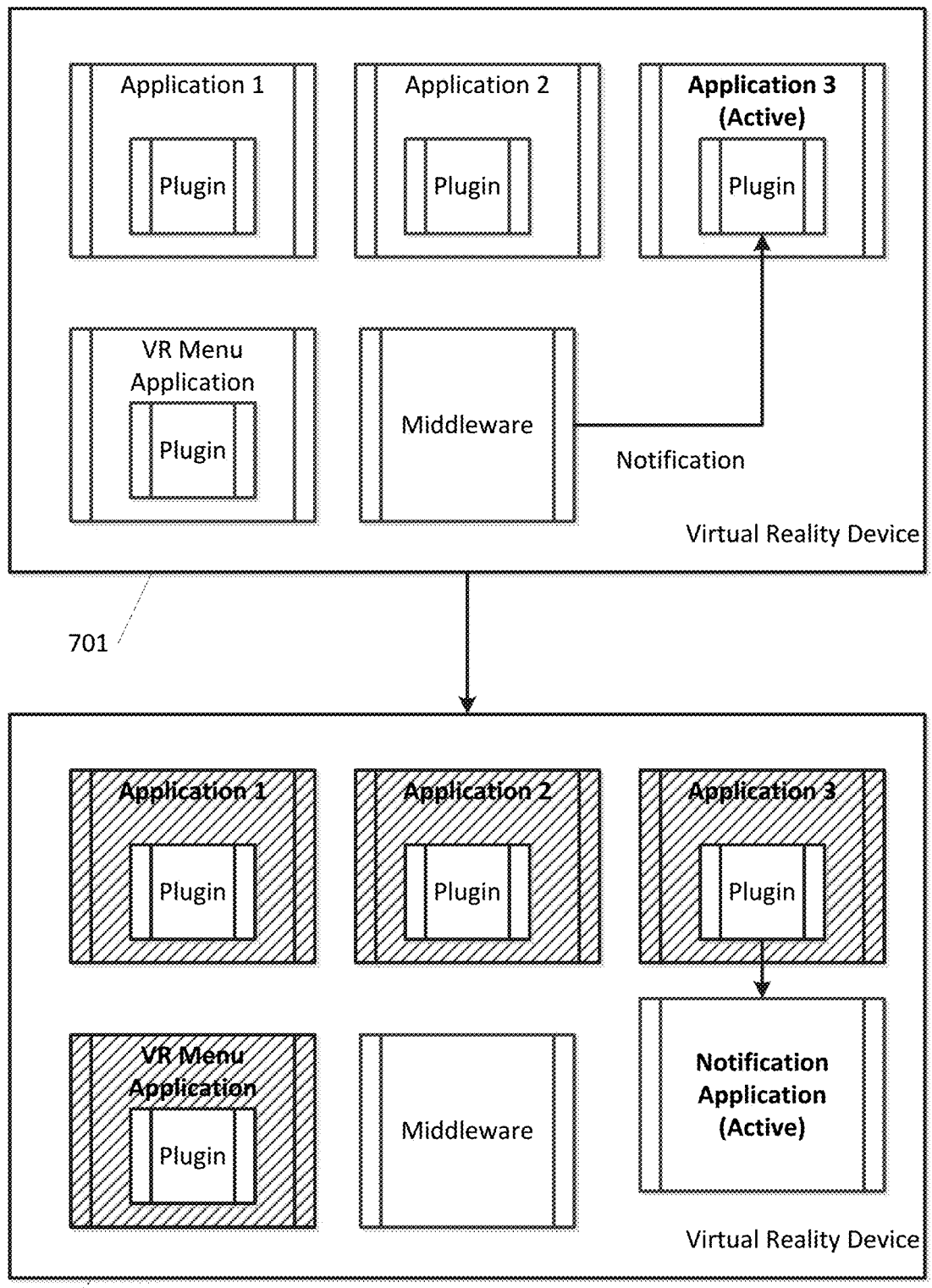
FIG. 7 illustrates an example of activating the notification application according to an exemplary embodiment.

FIG. 7 illustrates an example of activating the notification application according to an exemplary embodiment. Box 701 illustrates the state of VR device after the notification is transmitted from middleware to a notification plugin in active application 3, but before the notification plugin activates the notification application.

Box 702 illustrates the state of the VR device after the notification plugin in application 3 activates the notification application. As shown in box 702, once the notification application activates, all remaining applications in the VR device are disabled. However, the notification plugins within each of the applications remain active, allowing for additional messages from the middleware to be received.

The notification application can be activated in multiple modes, depending on the type of notification and the corresponding notification settings. In particular, the possible types of notifications can include "persistent" notifications and "non-persistent" notifications. Persistent notifications are configure to persist until a deactivation signal is received. By contrast, non-persistent notifications can be deactivated via user action, or optionally, through some other means, such as a timer.

Figure 8:
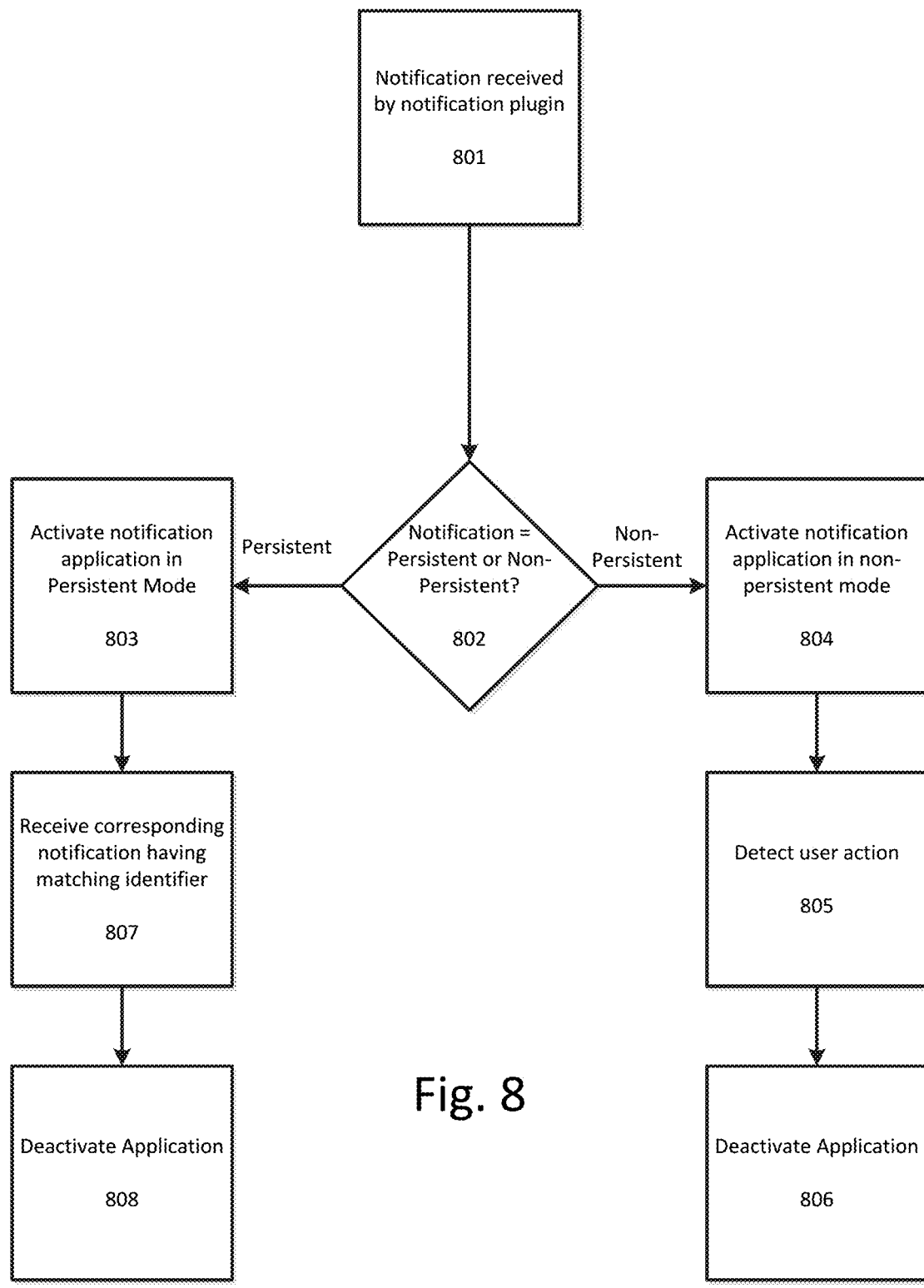
FIG. 8 illustrates a flowchart for activating, by the notification plugin, a notification application on the VR device.

FIG. 8 illustrates a flowchart for activating, by the notification plugin, a notification application on the VR device. At step 801 a notification is received by the notification plugin. This step corresponds to step 102 in FIG. 1, in which the middleware application transmits the notification to the notification plugin.

At step 802 a determination is made regarding whether the notification is persistent or non-persistent. The terms persistent and non-persistent are used for purposes of explanation only, and it is understood that these terms can refer to any two classes of notifications, where the first class requires a deactivation signal from the server and middleware, and the second class is able to be deactivated through other means, such as user input. This determination of whether a notification is persistent or non-persistent is not required to be made explicitly, and can be implicit in identifying a type of notification. For example, step 802 can correspond to determining that the notification message is a seat-belt notification. If the seat-belt notification is configured to be non-persistent, then the step of identifying the type of notification as a seat-belt notification can correspond to step 802.

If the notification is persistent, then the notification application is activated in persistent mode at step 803. Otherwise, if the notification is non-persistent, then the notification application is activated in non-persistent mode at step 804. Of course, rather than multiple modes, different notification applications can be used for the notifications corresponding to persistent and non-persistent application. For example, two different notification applications can be used, a non-persistent notification application and a persistent notification application. In another example, each notification can have its own unique notification application, and each unique notification application can have a setting or function indicating whether it is persistent or non-persistent. The examples are provided for illustration only, and are not intended to limit the scope of the described features, When the application is activated in persistent mode, then the receipt of a corresponding notification having a matching identifier at step 807 results in the deactivation of the notification application at step 808. For example, if a first notification is a persistent announcement notification, then the notification application is activated in persistent mode. If a second notification is received that is also a persistent announcement notification (which can be determined by checking an identifier or type), then the application is deactivated.

Additionally, state variables or flags can be part of the notification and can be used to activate or deactivate a persistent notification application. Using the previous example, the first notification can be <Notification ID=AN, State=ON>. If the second notification is <Notification ID=AN, STATE=OFF>, then the persistent notification application can be deactivated. By contrast, if the first notification is be <Notification ID=AN, State=ON> and the second notification is also <Notification ID=AN, State=ON>, then the notification application remains activated.

When the notification application is activated in non-persistent mode, then the detection of a specified user action (such as a user acknowledgement of the notification message) at step 805 results in deactivation of the application at step 806.

Figure 9A:
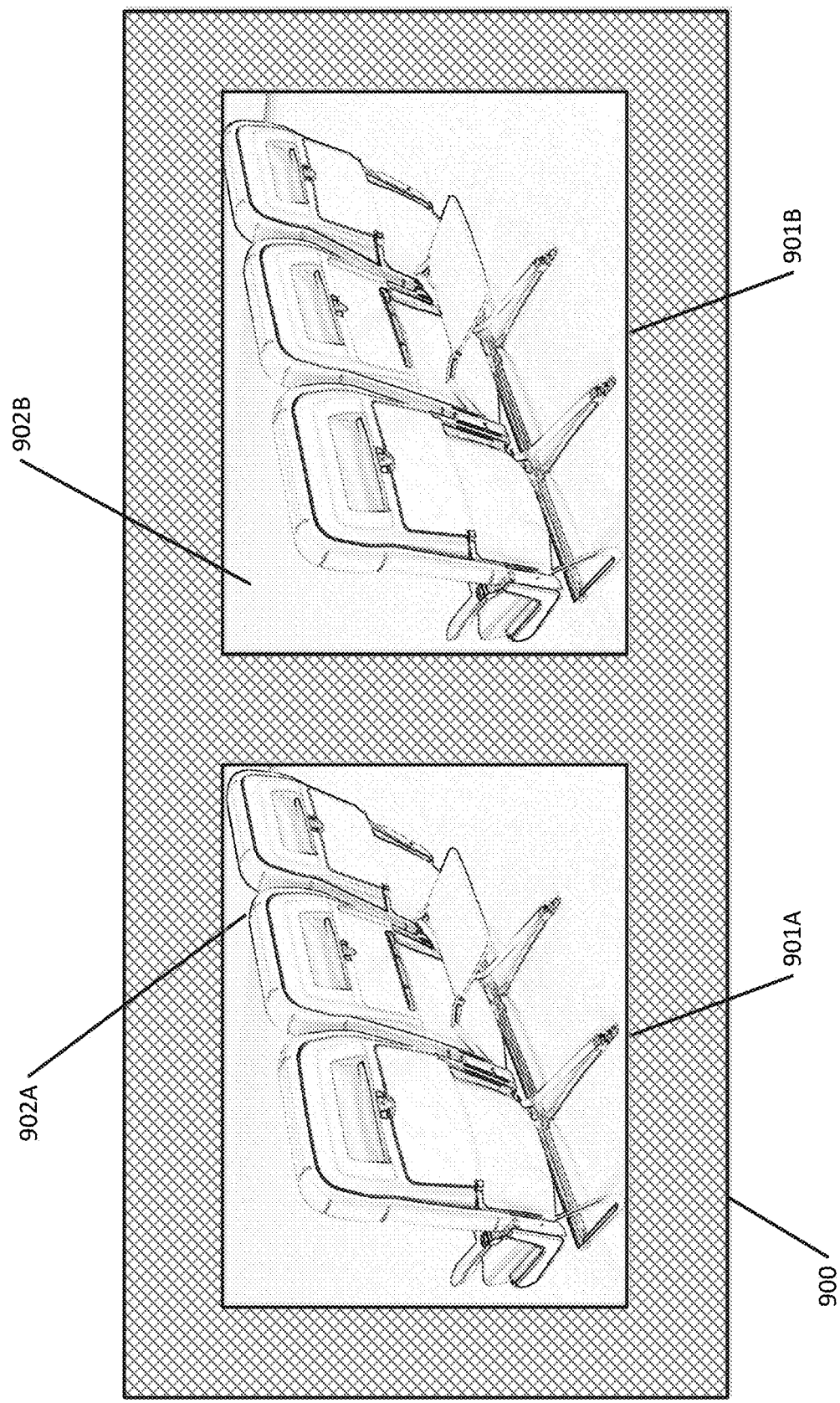
FIGS. 9A-9B illustrate an example of a persistent notification application according to an exemplary embodiment.
Figure 9B:
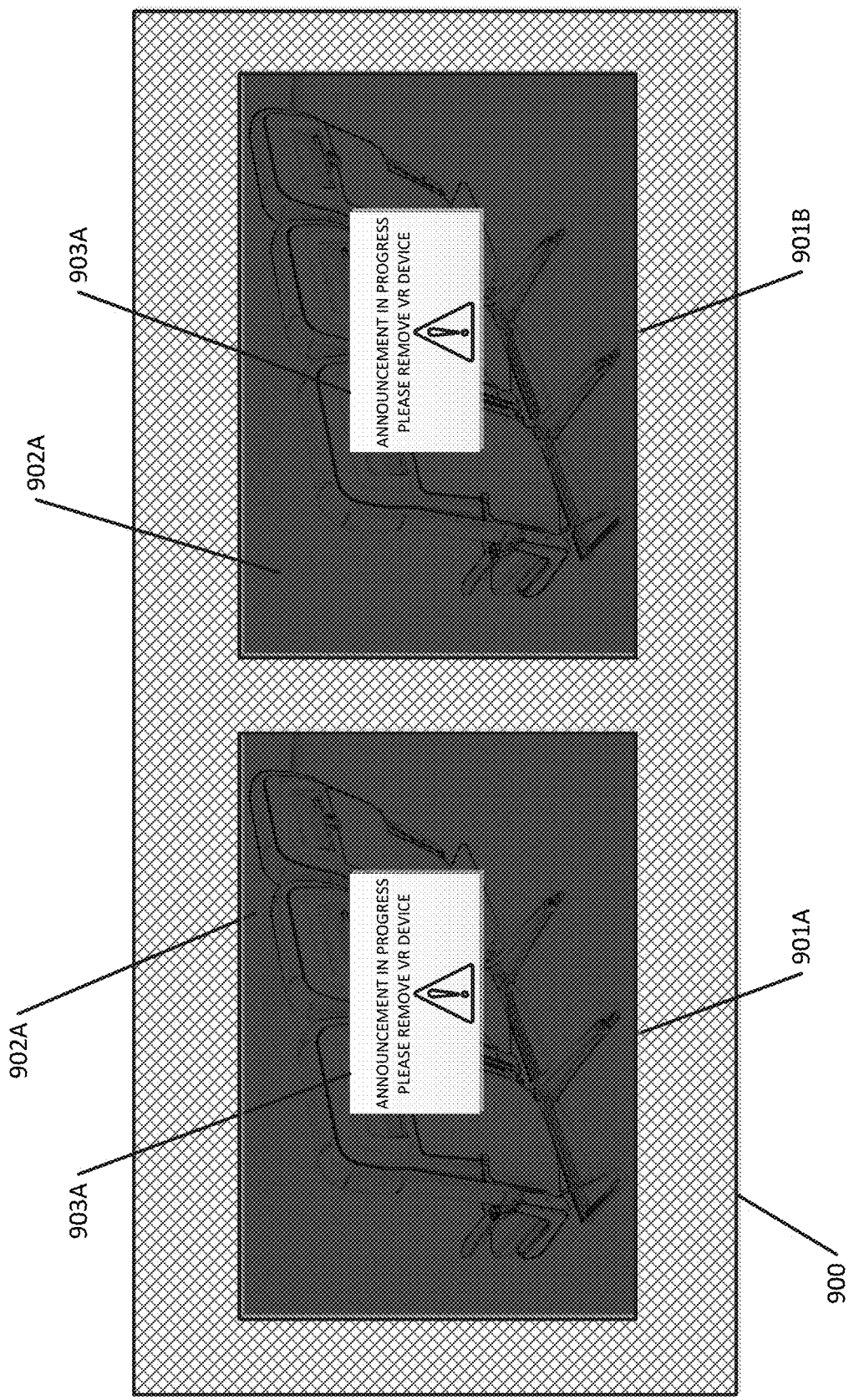

FIGS. 9A-9B illustrate an example of a persistent notification application according to an exemplary embodiment. As shown in FIG. 9A, a VR headset 900 includes two displays, 901A and 901B, corresponding to the two eyes of a user. This is shown for illustration only, and VR headset can alternatively have a single display that spans the entire width of the headset.

As shown in FIG. 9A, the VR device 900 has rendered three-dimensional environments 902A-902B in the each of the two displays 901A-901B. The rendered environments are nearly identical, having only slight differences to customize the environment to each eye. In this case, the environment shows seats aboard an airplane, which can be a default environment for the VR device.

FIG. 9B illustrates the presentation of notification messages 903A and 903B within environments 902A-902B. The notification application executing on VR device 900 is a persistent notification application, as user has no options for deactivating or otherwise removing the notification message or for accessing any functionality of the VR device 900 or other applications running on the VR device 900. The notification application shown in FIG. 9B will deactivate only upon receiving the corresponding deactivation notification, which in this case, can be an announcement notification specifying a state of "OFF."

Figure 10A:
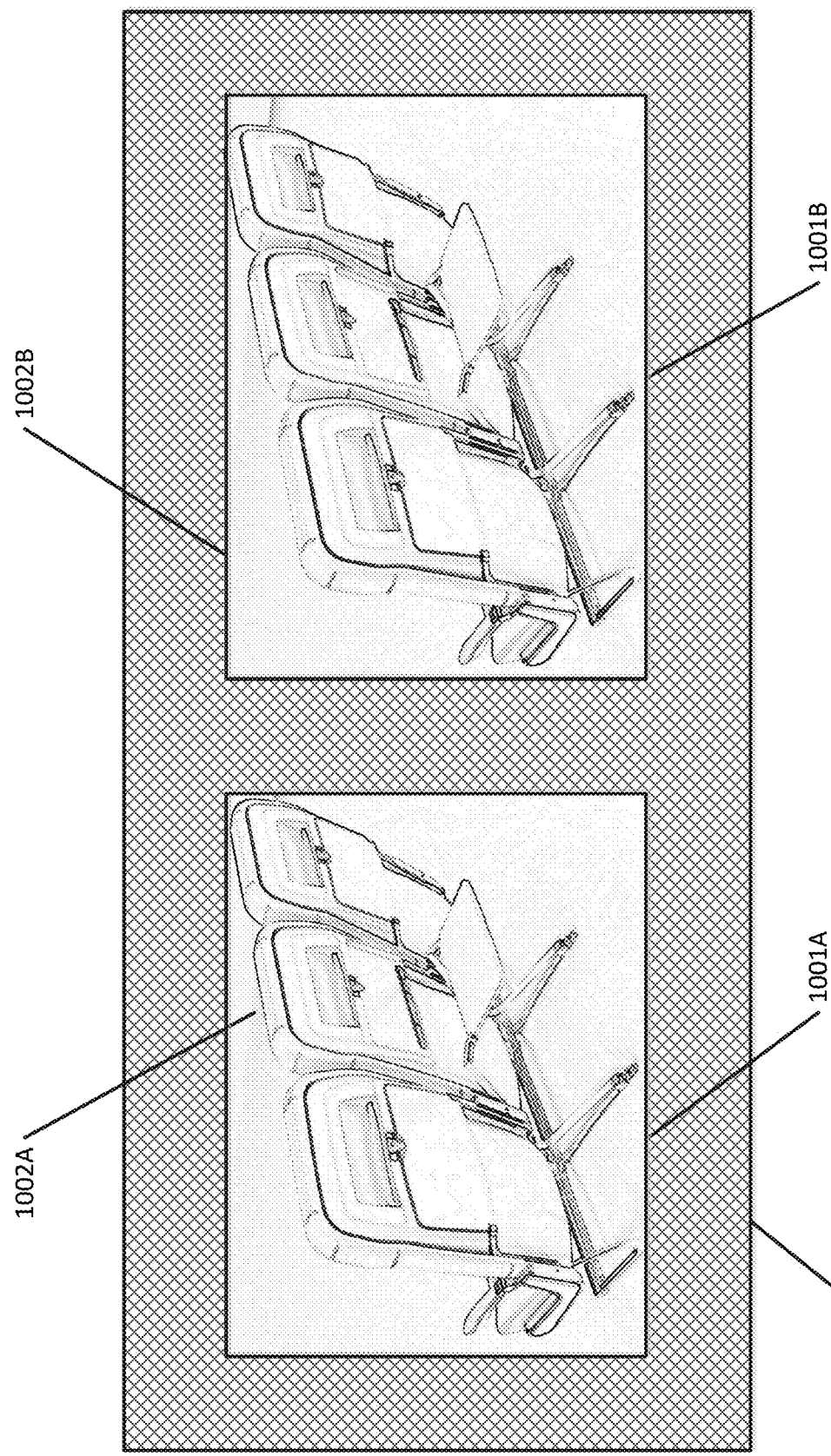
FIGS. 10A-10B illustrate an example of a non-persistent notification application according to an exemplary embodiment.
Figure 10B:
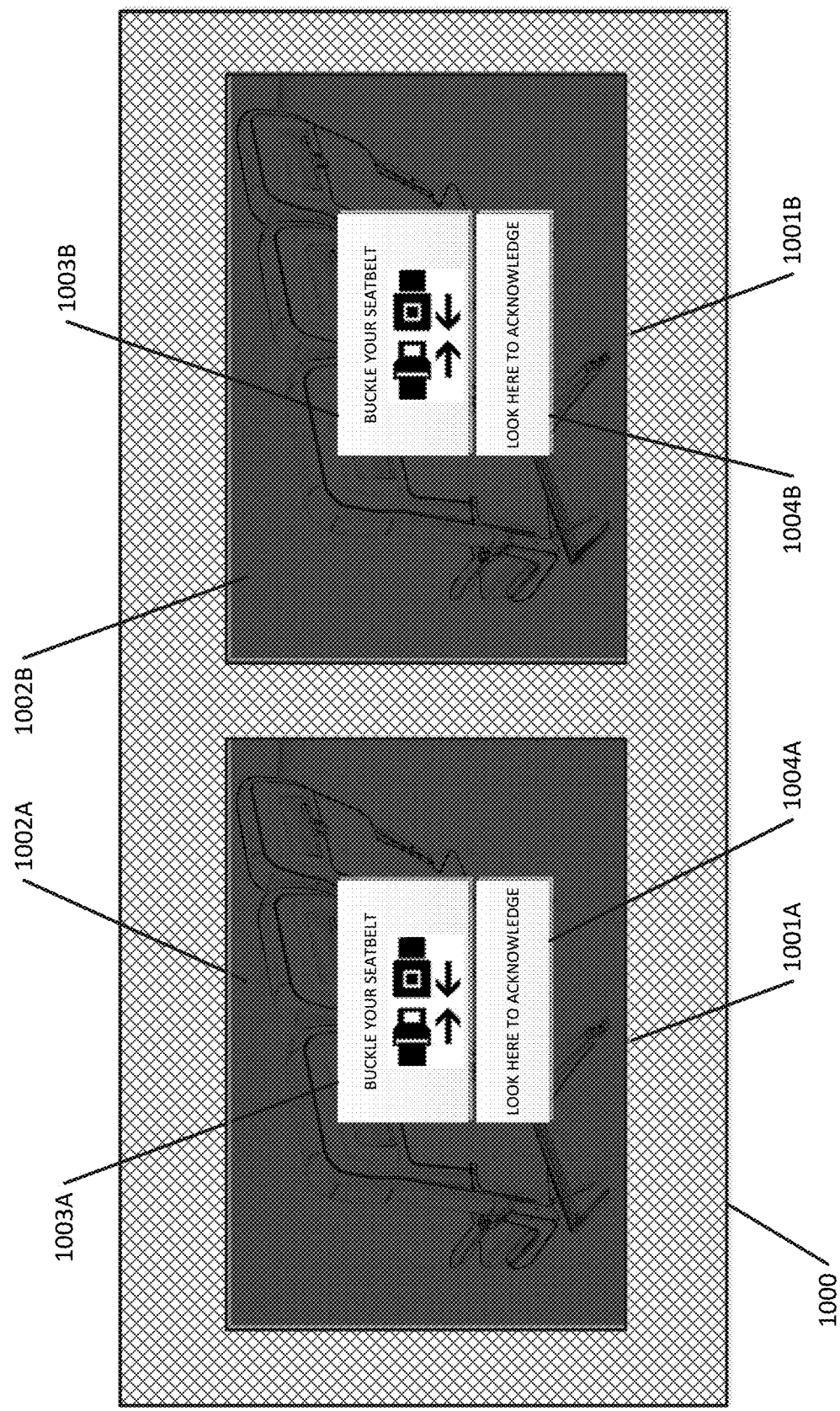

FIGS. 10A-10B illustrate an example of a non-persistent notification application according to an exemplary embodiment. Similar to FIG. 9A, FIG. 10A illustrates environments 1002A-1002B rendered on displays 1001A-1001B of VR device 1000. FIG. 10B illustrates notification messages 1003A-1003B of a non-persistent notification application. In addition to notification messages 1003A-1003B, the non-persistent notification application transmits acknowledgment messages 1004A-1004B.

The non-persistent notification application transmits acknowledgment messages 1004A-1004B at predetermined locations within the environment 1002A-1002B. These locations, referred to as acknowledgment locations, can be specified by a set of coordinates in two dimensions (on the plane of the display) or by a set of coordinates in three dimensions, defining a volume in the environments 1002A-1002B. The acknowledgment locations can be stored in the system, for example, in a memory of the notification application or elsewhere on the VR device.

The notification application can, while displaying the notification messages 1003A-1003B and acknowledgment messages 1004A-1004B, run a routine to track input from a user of the VR device 1000. If the notification application detects a pointing and/or selection input corresponding on the location of the acknowledge message 1004A-1004B, then the notification application can deactivate, returning the VR device to unrestricted operation. An example of pointing input method can be via head tracking, while selection input method can be detected via elapsed time that the user is pointing at the acknowledge message 1004A-1004B. Of course, any pointing and/or selection input can be utilized. For example, the user can push a button, switch, or other input mechanism on a controller or pointing device (such as a mouse, joystick, etc.) that is connected to the VR system.

In addition to a notification application, the notification system can utilize a persistent notification toolbar (referred to herein as "notification toolbar," "toolbar" and "quick bar") that is permanently visible in the environment rendered by the VR device. The notification toolbar can also be part of the SDK that is implemented in the plugins embedded in each application and can be accessible to all plugins.

Figure 11:
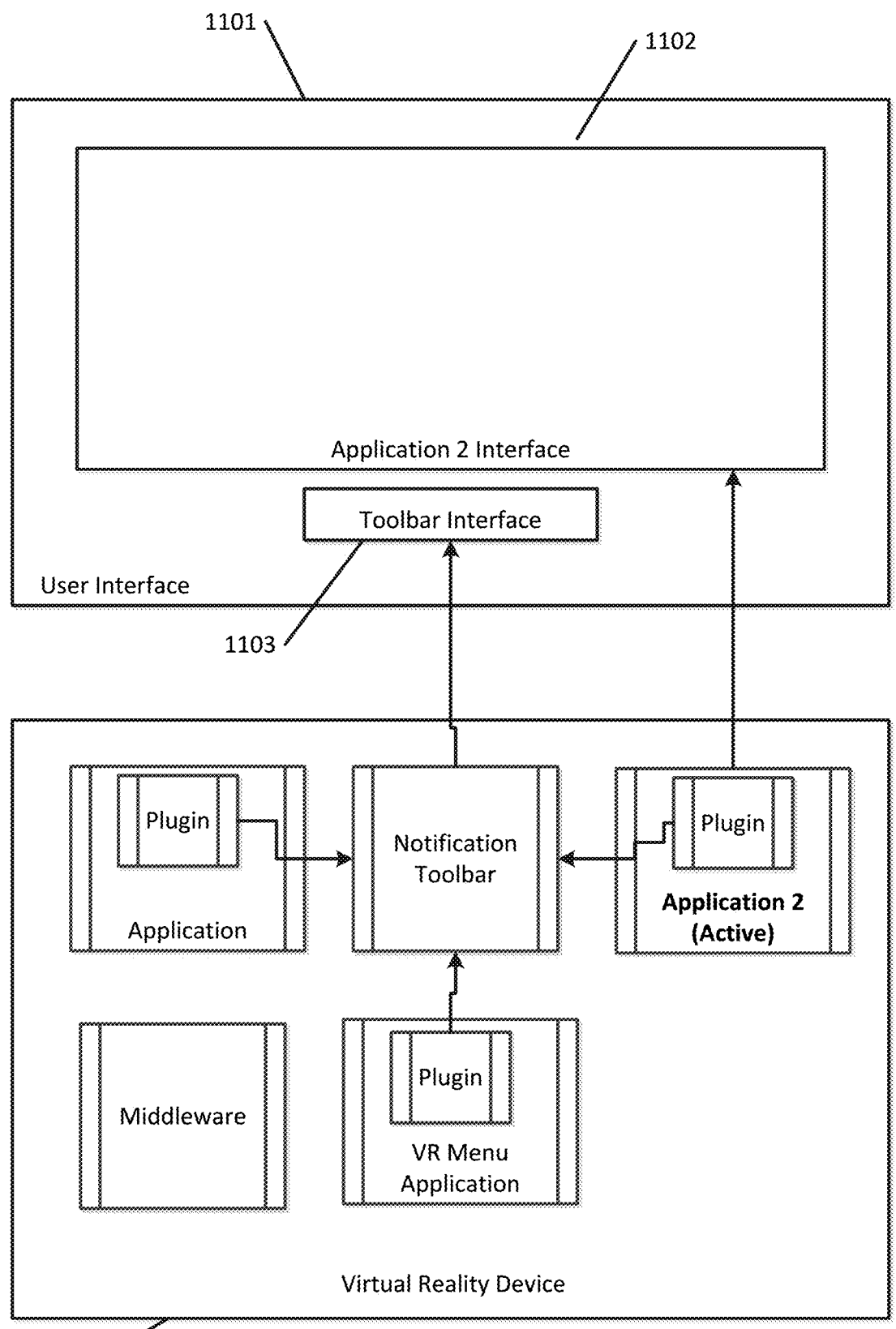
FIG. 11 illustrates a software and user interface diagram of the notification toolbar according to an exemplary embodiment.

FIG. 11 illustrates a software and user interface diagram of the notification toolbar according to an exemplary embodiment. As shown in FIG. 11, the notification toolbar is a UI element controlled by the plugins executing on the VR device 1100 and renders a toolbar interface 1103 within the user interface 1001 (environment) of the VR device. The notification toolbar is shown as a separate entity in FIG. 11 for the sake of clarity only, and it is understood that the notification toolbar can be part of the same SDK that is implemented in the plugins embedded in each application.

The user interface 1101 in FIG. 11 additionally displays an interface 1102 corresponding to application 2, which is the active application on VR device 1100. Each of the plugins in each application is able to access and send commands to the notification toolbar application. Therefore, regardless of which application is active, notifications and messages can be passed to the notification toolbar application.

Figure 12:
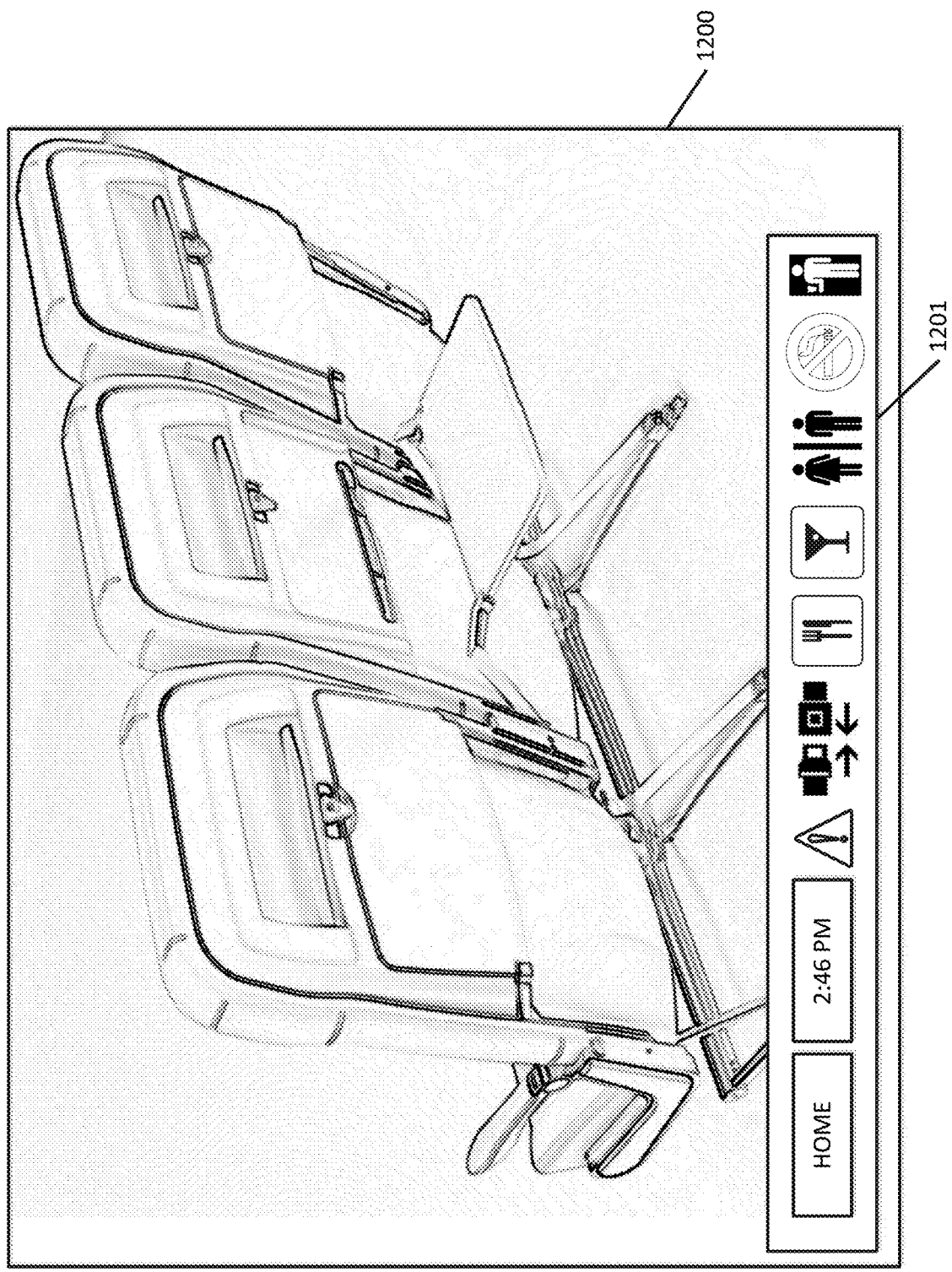
FIG. 12 illustrates an environment rendered by the VR device including the notification toolbar according to an exemplary embodiment.

FIG. 12 illustrates an environment rendered by the VR device including the notification toolbar according to an exemplary embodiment. As shown in FIG. 12, the notification toolbar 1201 is superimposed on the environment 1200, such that it is always visible to a user of the VR device. The notification toolbar can include one or more icons, such as icons for a home screen or other navigation buttons, a time and/or date icon, an alert or warning icon that can be used for emergencies or turbulence, a fasten seatbelt icon that can activate or deactivate, a meal service icon to indicate when meal service is taking place, a drink icon to indicate when drink service is taking place, a restroom icon indicating when a restroom is in use or available, a prohibited activities icon (such as a non-smoking sign), and a flight attendant button to request assistance from a flight attendant. Any of the icons can change appearance to indicate activation or deactivation (such as by changing color, brightness, size, etc.).

Figure 13A:
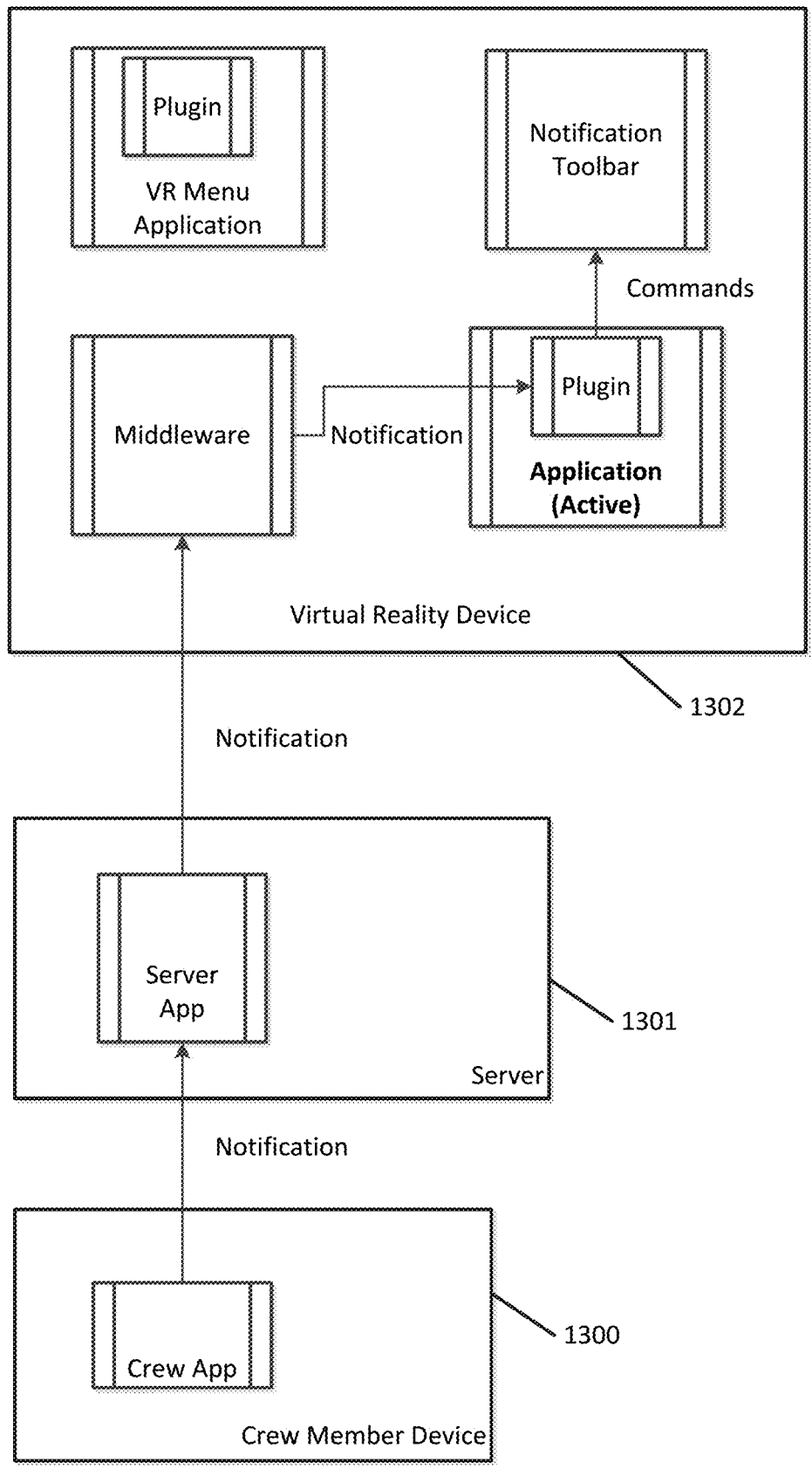
FIG. 13A illustrates a message diagram for transmitting a notification to the notification toolbar according to an exemplary embodiment.

The notification plugins integrated into the applications executing on the VR device can be used to pass commands and notifications to the notification toolbar. FIG. 13A illustrates a message diagram for transmitting a notification to the notification toolbar according to an exemplary embodiment. The crew application in crew member device 1300 transmits a notification to the server app on server 1301. This notification is then passed by server app to middleware executing on the VR device 1302. Middleware then sends the notification to the notification plugin of the active application. Plugin then sends one or more commands to the notification toolbar application. The commands can be configured, for example, to activate or deactivate one or more icons on the notification toolbar.

Additionally, user can transmit requests to flight staff or other administrators by activating one or more icons on the notification toolbar through gaze detection. For example, a plugin of an active application can execute a routine during standard (non-restricted) operation of the VR device to track a user's gaze and identify when a user is looking at an icon on the notification toolbar. As discussed earlier, gaze detection can be implemented through the use of one or more cameras facing towards the user's eyes. The position of a user's pupils can be used to project rays outwards into the rendered environment and detect a position or location of the user's gaze.

Figure 13B:
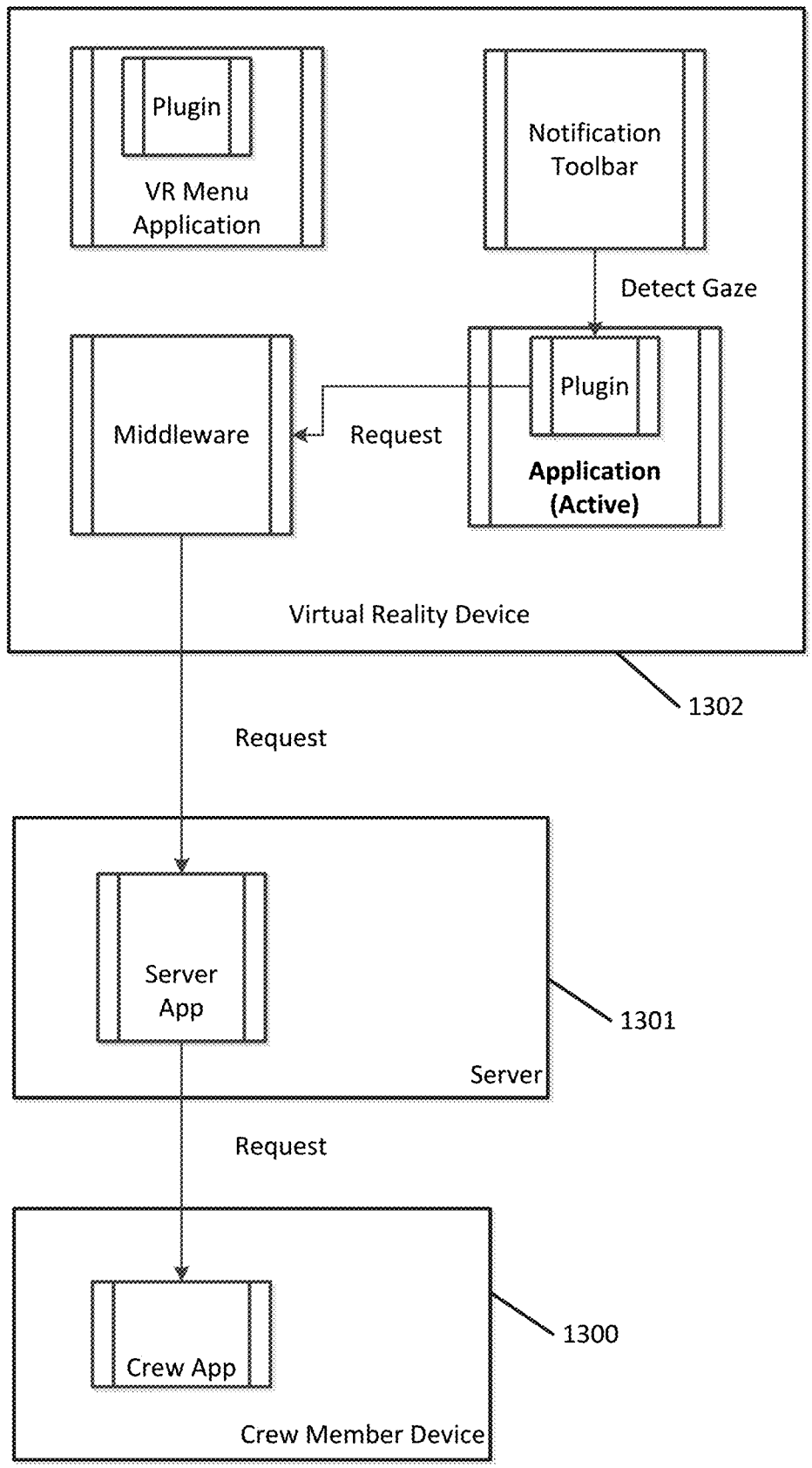
FIG. 13B message diagram for transmitting a request from the notification toolbar to a crew member according to an exemplary embodiment.

FIG. 13B message diagram for transmitting a request from the notification toolbar to a crew member according to an exemplary embodiment. The notification plugin integrated in the active application first detects that a gaze location of the user wearing the VR device corresponds to a location of an icon on the notification toolbar (such as the flight attendant assistance icon). The notification plugin then generates a request, including a device identifier of the VR device (which can be stored in memory or read from the device), and transmits the request to the middleware. The middleware then transmits the request from the middleware on VR device 1302 to server application on the server 1301.

The server application can then identify a seat corresponding to the request. The server application can store, for example, a table (or any other memory or data structure) listing all pairs of seats and corresponding VR devices (by device identifier). When the server application receives the request with the device identifier, the server application can consult this table to identify the appropriate seat.

After determining the seat, the server application can then identify a crew member corresponding to the identified seat. Again, the server application can store a table or other data structure mapping seats to crew members and crew member device identifiers. The server can utilize the identified seat to identify the appropriate crew member.

Additionally, the server can instead store a table mapping between crew device identifiers and VR device identifiers. In this case, it is not necessary to identify the seat and the VR device identifier can be used to lookup the corresponding crew member device identifier.

The server then optionally reformats the requests for the crew member device and then transmits the request to the crew member device for the appropriate crew member. The crew member can then receive the request on their device. The request can indicate the seat number of the VR device that submitted the request. Alternatively, crew member device can store a mapping of VR devices to seat numbers, in which case a VR device identifier can be used to lookup a corresponding seat and display the seat information on the display of the crew member device (such as in a seating map, with the requesting seat highlighted).

Figure 14:
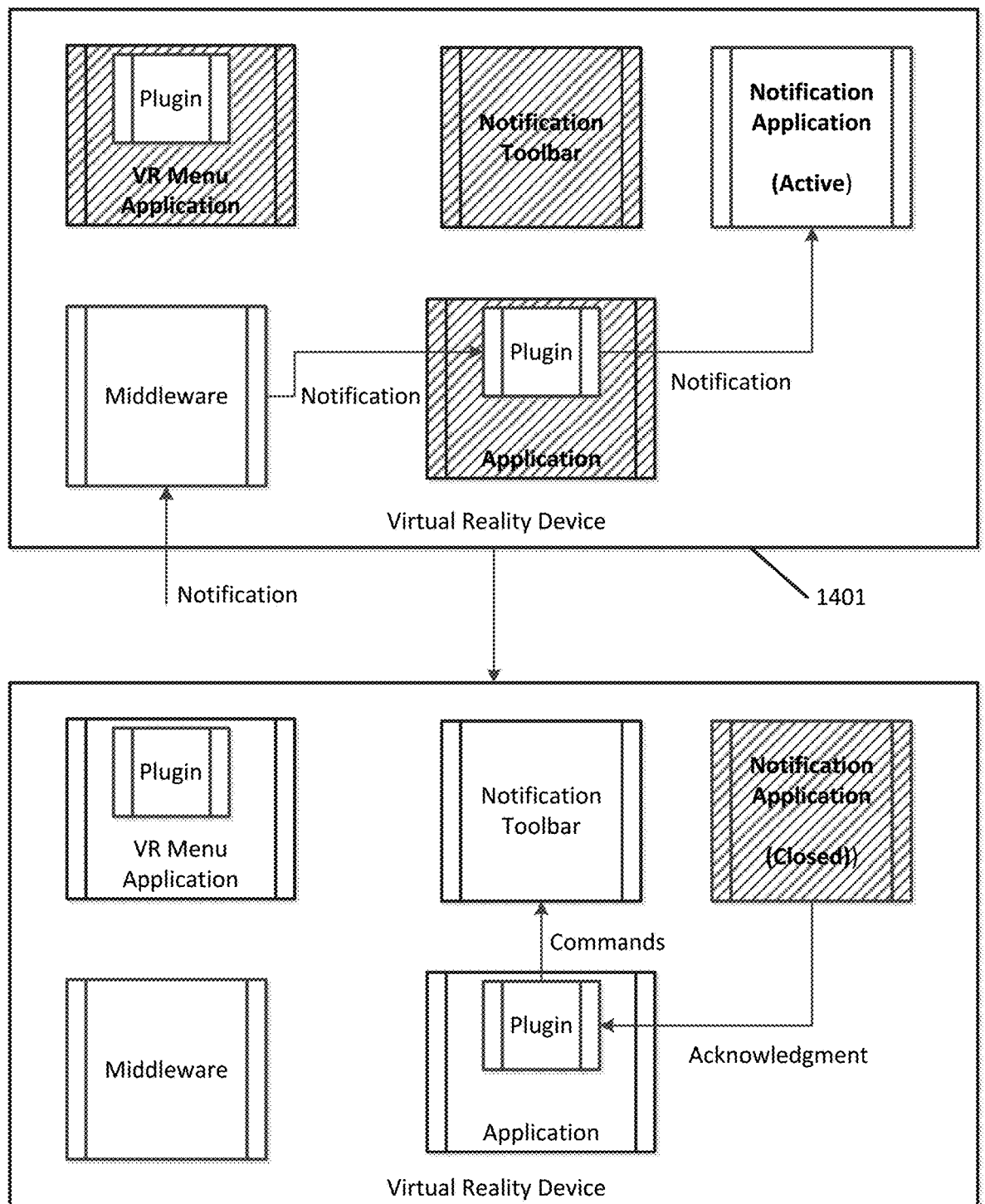
FIG. 14 illustrates a diagram for transmitting notifications to both the notification application and the notification toolbar according to an exemplary embodiment.

Notifications transmitted from the server to the VR device can trigger both the notification application and one or more notifications in the notification toolbar. FIG. 14 illustrates a diagram for transmitting notifications to both the notification application and the notification toolbar according to an exemplary embodiment.

As shown in box 1401, a notification has been received at the middleware, send to the plugin in the application (that was active at the time), and then used by the plugin to activate the notification application, which is currently active. Since notification application is active, all other applications are disabled.

Box 1402 illustrates the steps that take place after notification application is closed. The notification can be closed based upon detecting a user acknowledgment. This acknowledgment is then passed to plugin, which then transmits one or more commands to the notification toolbar to update the notification toolbar. Since toolbar is disabled during the notification application execution, the updates to the toolbar can be passed through after the notification application is closed.

Alternatively, the notification toolbar can be configured to be immune from the notification application, meaning that it continues to function even during notification application execution. In this case, when the notification is received at the plugin from the middleware, the plugin can both transmit commands or instructions to the notification toolbar to update the toolbar application and also execute the notification application to disable all other applications.

Figure 15:
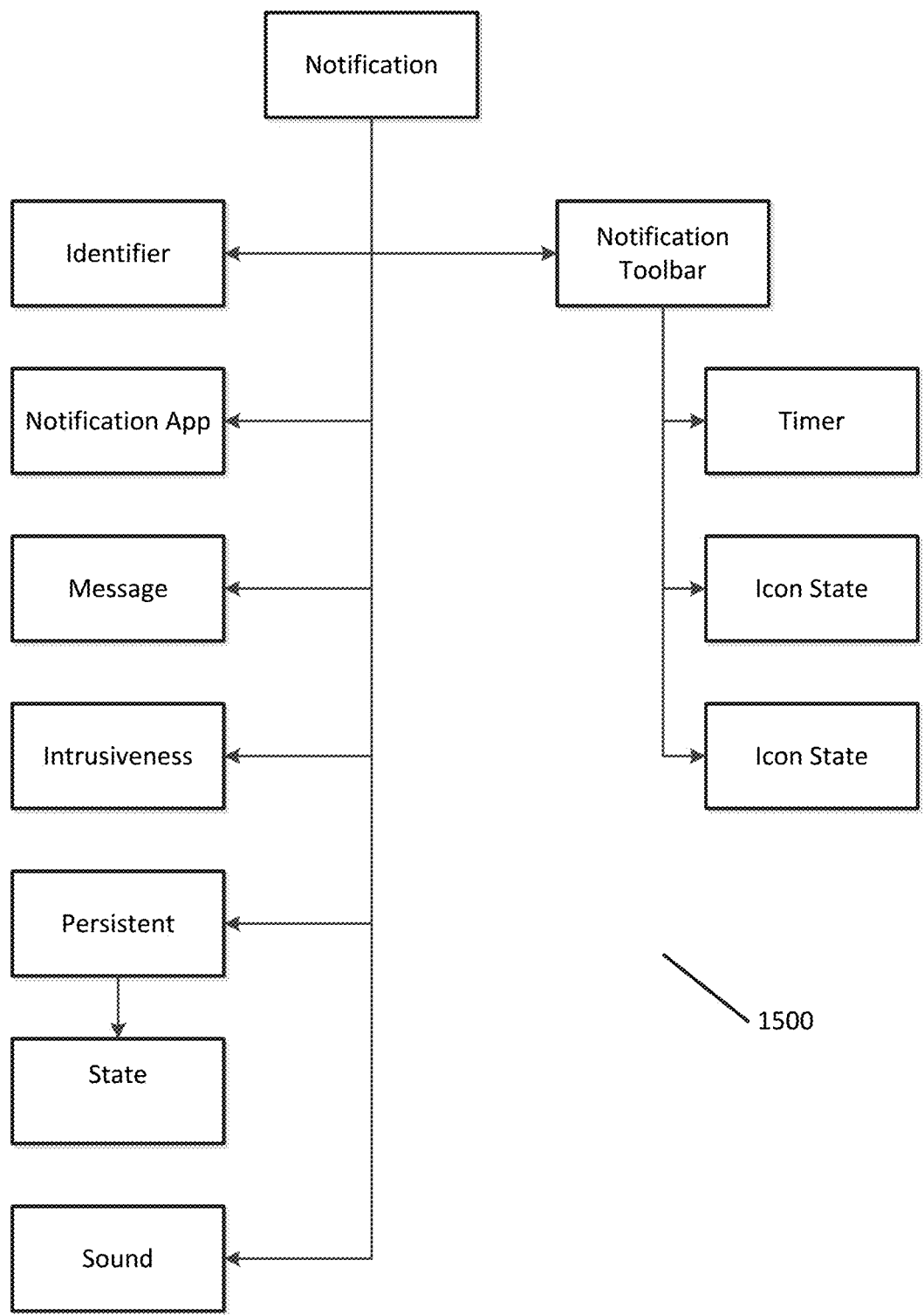
FIG. 15 illustrates a notification data model according to an exemplary embodiment.

FIG. 15 illustrates a notification data model 1500 according to an exemplary embodiment. As shown in FIG. 15, the notification data model can include a number of different attributes and variables. Identifier variable identifies the notification or the type of notification (e.g., announcement, food service, etc.). "Notification app" variable can be a flag (Boolean) variable that indicates whether the notification application should be called when the notification is received by a plugin. Message variable can be a character array or string indicating the appropriate message corresponding to the notification.

Intrusiveness variable can have limited defined range, such as (1-5), that indicates an intrusiveness level of a particular notification. This can be set for all notifications of a certain type (e.g., emergency notifications are level 5) or on a per-notification basis (e.g., the last drink service before landing is 3). The intrusiveness level can be used to customize characteristics of the notification and how it is displayed, such as size, font, brightness, accompanying audio, or any other visual or audio characteristics. For example, the process of displaying a notification message of a notification that is executed by the notification application can include identifying one or more settings corresponding to the intrusiveness level of the notification, and then customizing and rendering the notification message based upon the settings. The settings can be user configured (for example, each airline can configure their own intrusiveness levels and settings).

The notification data model can also include a sound attribute that defines what sounds or audio to play for a particular notification, as well as sound attributes, such as volume, bass, pitch, etc.

Returning to FIG. 15, the persistent variable can be, for example, a Boolean flag value indicating whether the notification is a persistent or non-persistent notification, as discussed earlier. If the notification is persistent, then state variable can indicate whether the notification is an ON or OFF notification.

The notification can includes a "Notification Toolbar" variable indicating whether the notification implicates or has any effect on the notification toolbar. If this variable is false, then the notification can be configured to have no effect on the toolbar. If this variable is true, then the notification can optionally additionally include variables reflecting an icon (the affected icon), an icon state (ON or OFF) that turns an icon on or off, and a timer variable indicating the duration after which the notification should be removed from the toolbar or the icon should be deactivated.

Figure 16:
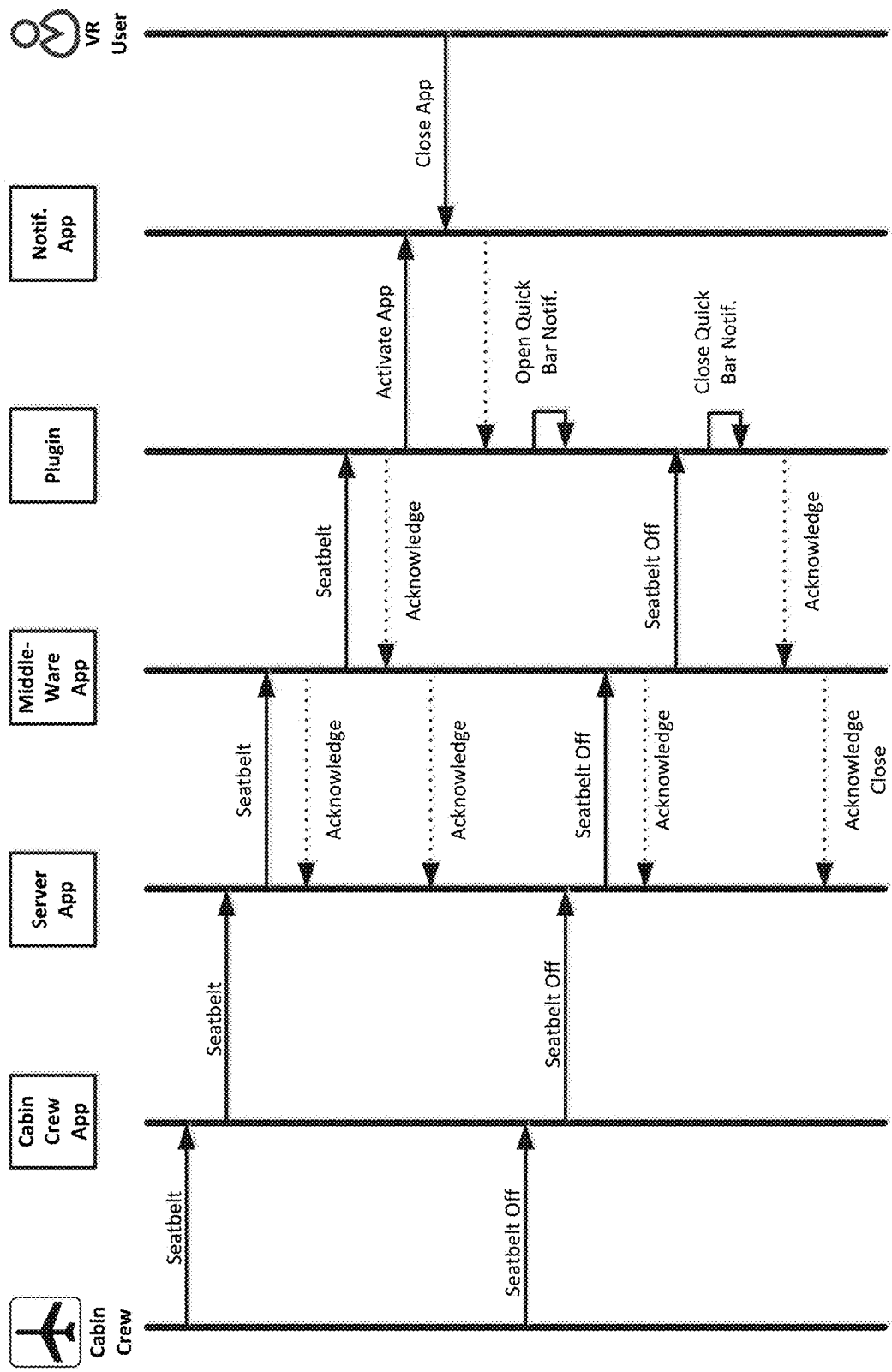
FIG. 16 illustrates a message passing diagram for a seatbelt notification according to an exemplary embodiment.

FIG. 16 illustrates a message passing diagram 1600 for a seatbelt notification according to an exemplary embodiment. As shown in FIG. 16, a cabin crew member originates the notification by entering it into their cabin crew app on their device. The notification is then passed to the server and then to the middleware (which acknowledges). From the middleware, it is sent to the plugin for the active application (which acknowledges, the acknowledgment being passed back to the server), and then used by the plugin to activate notification application. Once user closes the notification application (such as by acknowledging), the closing sent back to the plugin, which issues commands to the notification toolbar (referred to in FIG. 16 as the "quick bar" for brevity) to activate the seatbelt icon. Later, when the seatbelt off notification is sent by the crew member and reaches the plugin, it causes the plugin to transmit commands to the quick bar to deactivate the seatbelt icon.

Figure 17:
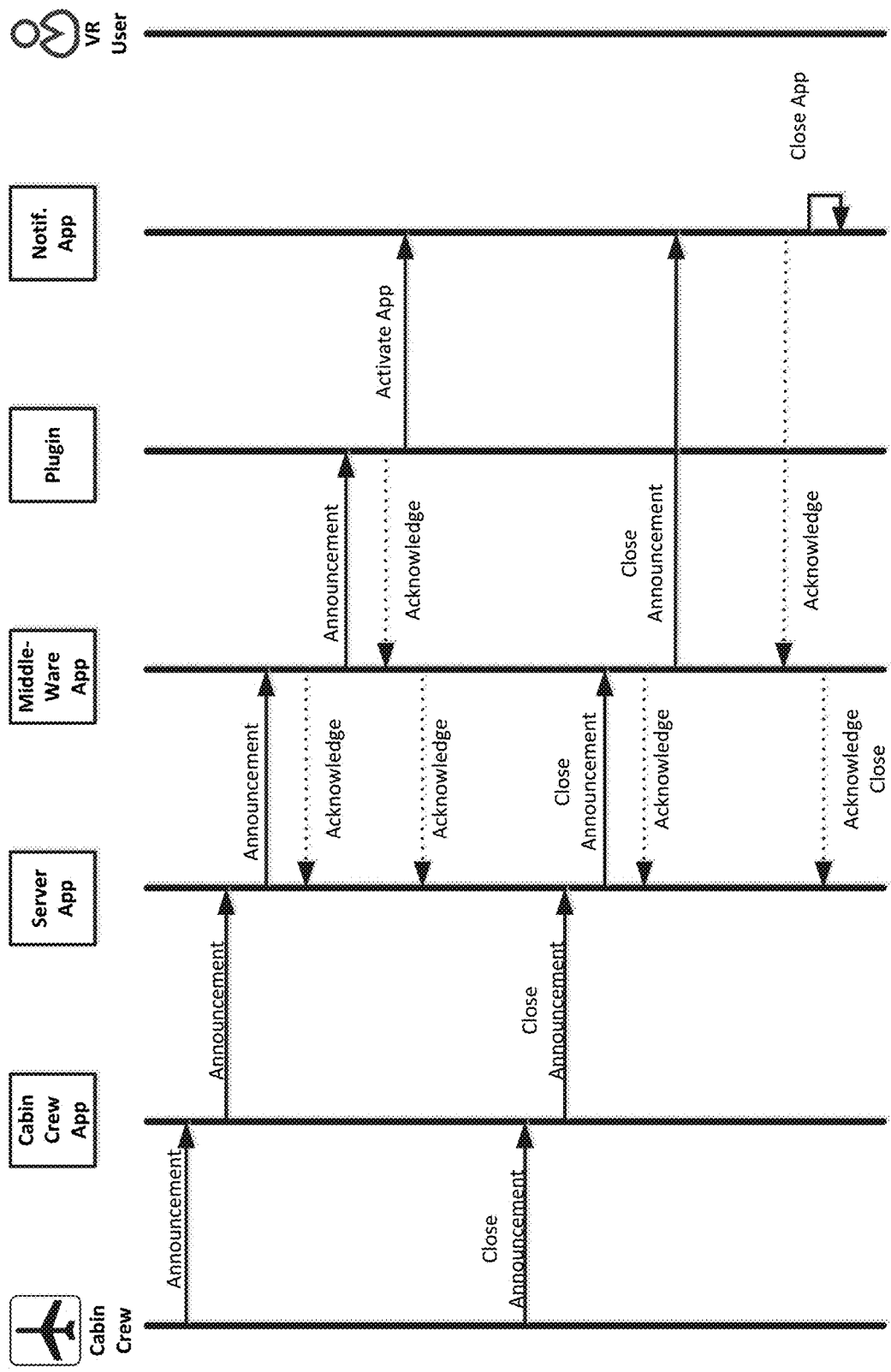
FIG. 17 illustrates a message passing diagram for an announcement notification that is persistent and is only closed once the close announcement notification is received by the notification plugin and notification application.
Figure 18:
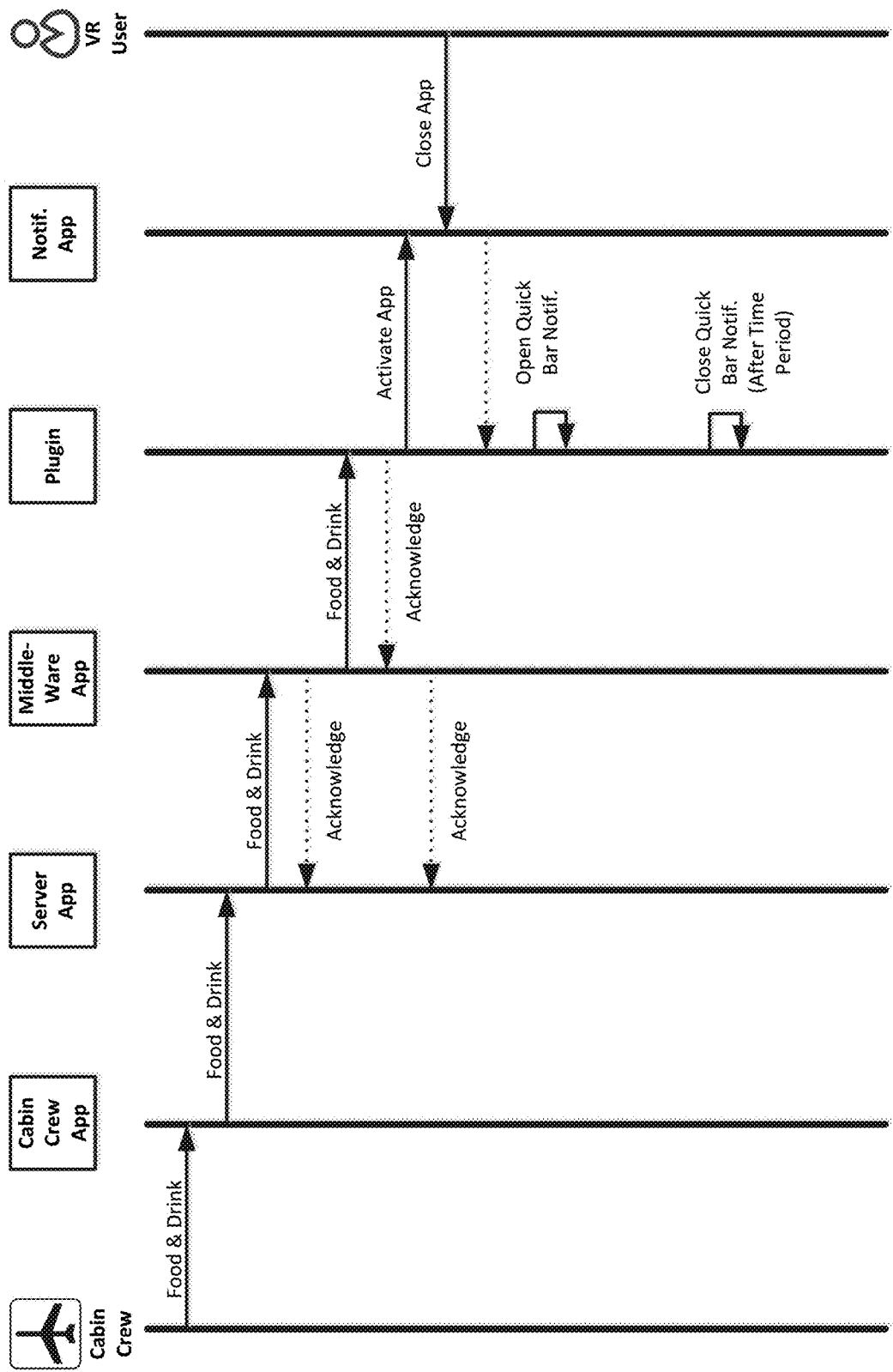
FIG. 18 illustrates a message passing diagram for a food and drink notification that causes the notification application to execute.
Figure 19:
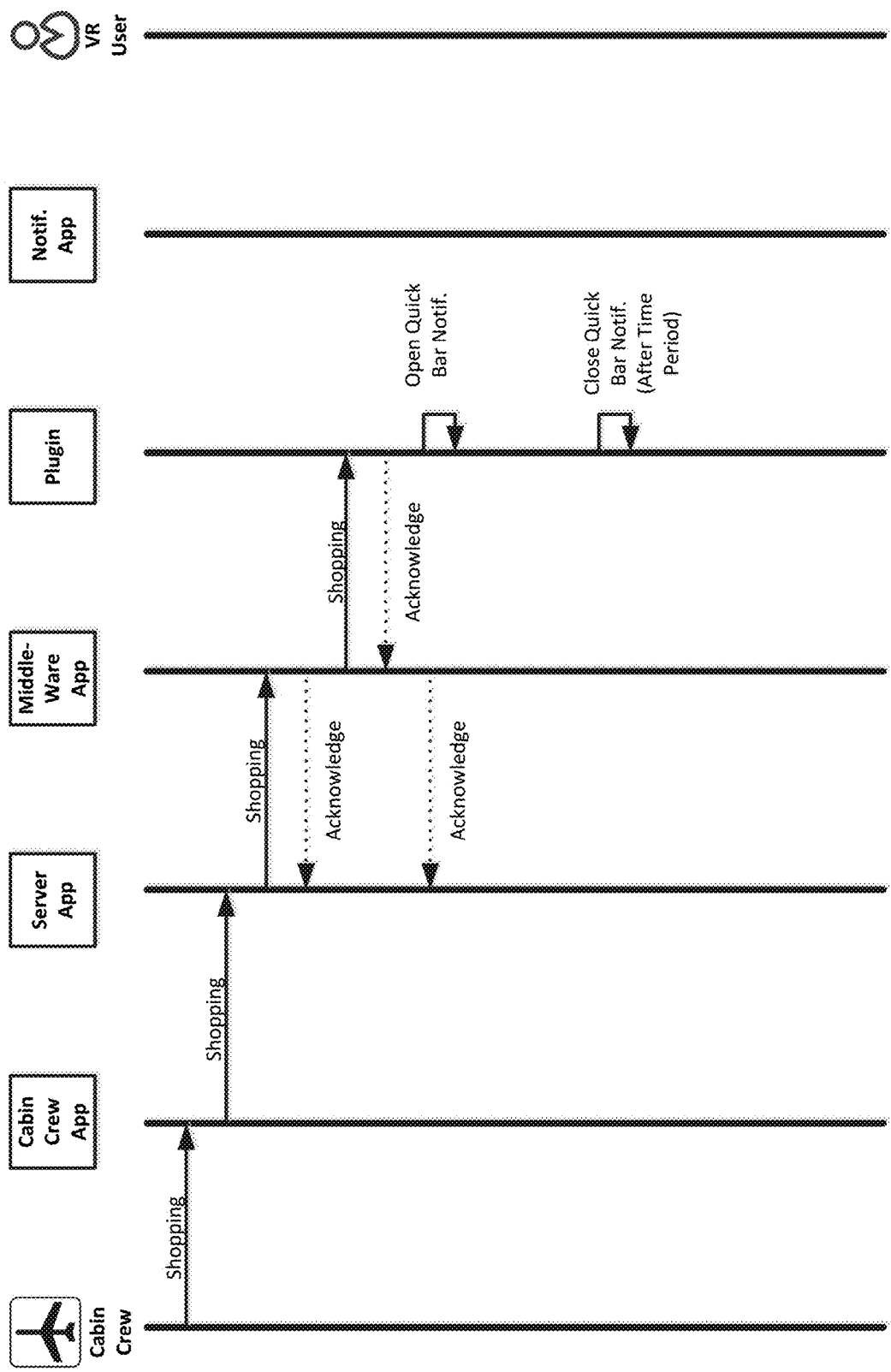
FIG. 19 illustrates a message passing diagram for a shopping notification to alert passengers of shopping opportunities in-flight.

FIGS. 17-19 illustrate similar types of message passing diagrams for other notifications. Specifically, FIG. 17 illustrates a message passing diagram 1700 for an announcement notification that is persistent and is only closed once the close announcement notification is received by the notification plugin and notification application.

FIG. 18 illustrates a message passing diagram 1800 for a food and drink notification that causes the notification application to execute. After the notification application is closed by the user (through acknowledgment), the plugin issues commands to the quick bar to activate the food & drink icon for a limited time period, after which it is deactivated.

FIG. 19 illustrates a message passing diagram 1900 for a shopping notification to alert passengers of shopping opportunities in-flight. This notification does not cause execution of the notification application and merely causes display of an icon in the quick bar for a limited period of time.

Figure 20:
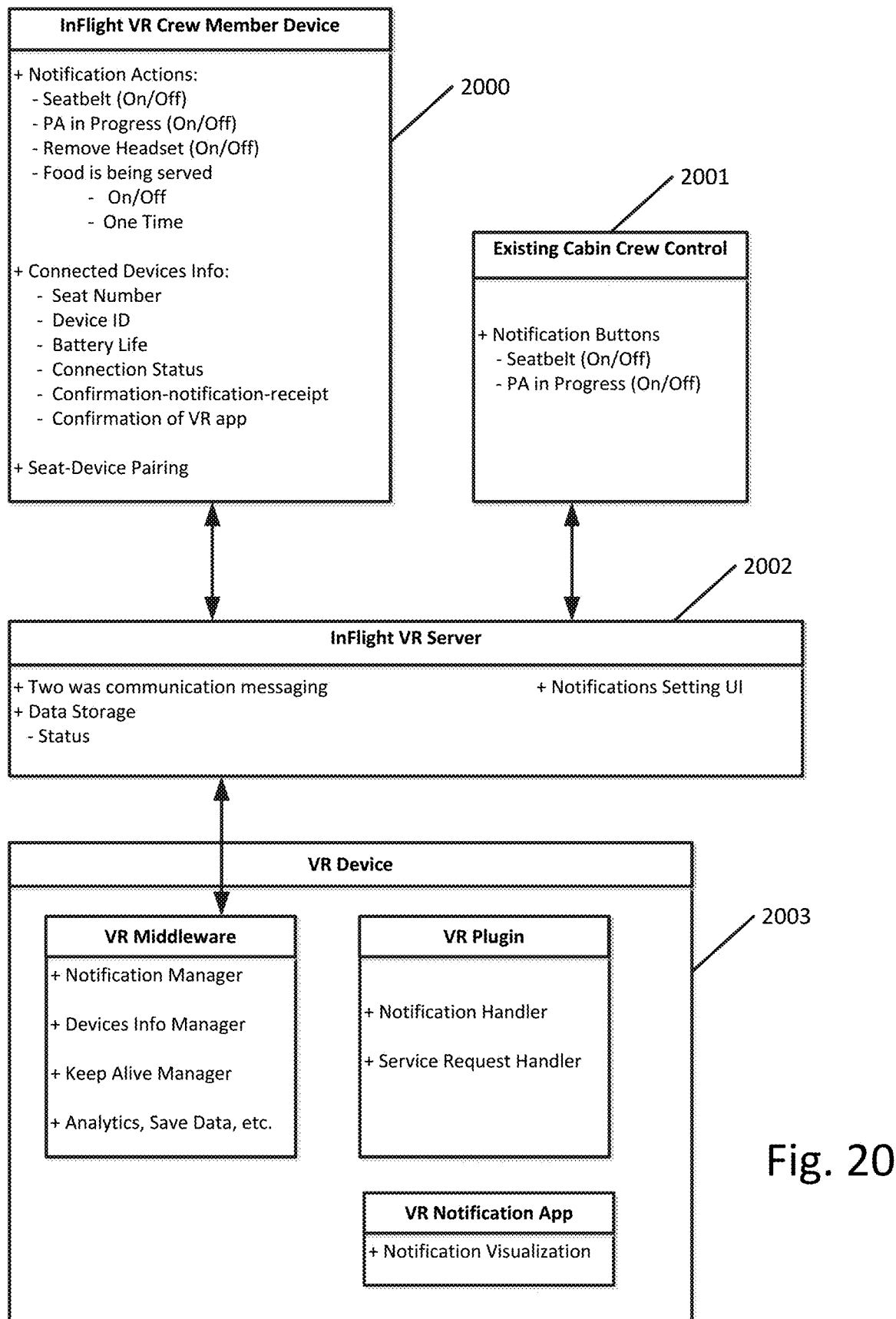
FIG. 20 illustrates various different devices that can be used in the system for managing notifications delivered to a VR device according to an exemplary embodiment.

FIG. 20 illustrates various different devices that can be used in the system for managing notifications delivered to a VR device according to an exemplary embodiment. FIG. 20 also illustrates the software executing on each of the devices and the functions of that software. These are explained in more detail below.

Crew member device 2000 runs a crew member application that can be used to push notifications to all connected VR users (through the server), pair seats with VR devices for better control and visualization of the users' distribution, and review or view device and usage status for all paired devices.

Pairing can be performed upon VR device distribution. The crew member can, for example, scan a bar code or QR code on the VR device using the crew member device 2000 or use a Near-Field Reader to read a Near Field Chip in the VR device. Alternatively, the crew member can input an identification code of the VR device into an interface of the display of the crew member device 2000. This scanning or input can cause the display of an interface on the display of the device 2000 prompting the crew member to enter a corresponding seat number. Once the crew member enters the seat number, the crew member device can store the pairing between the seat and the VR device.

The notifications that can be pushed to the connected VR devices include seatbelt (On/Off), Announcement (On/Off), Remove Headset (On/Off), Food (either On/Off or one time), emergency notifications, turbulence, or any others.

The crew member can also view the status of all connected devices through an interface of the crew member device 2000. The status information can include, for each seat/VR device pairing, a seat number, device ID, battery life, connection status, confirmation that a notification was received, and/or confirmation that a user is online.

Figure 21:
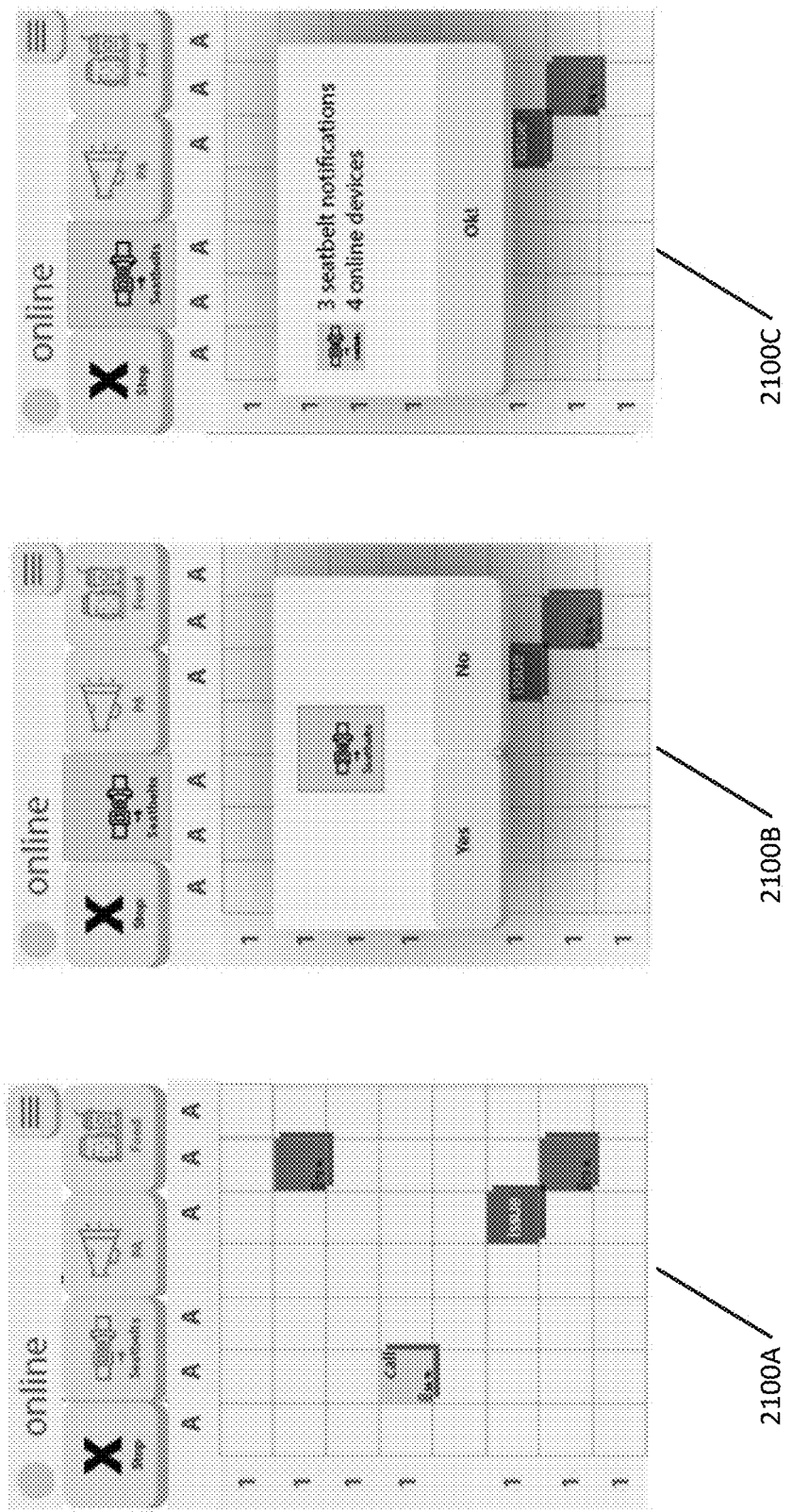
FIG. 21 illustrates the status interface of crew member device according to an exemplary embodiment.

FIG. 21 illustrates the status interface of crew member device 2000 according to an exemplary embodiment. Interface 2100A illustrates the seat map, along with status of each of the four connected devices. As shown, one of the devices has a technical issue. Interface 2100B illustrates the interface after the crew member has selected the seatbelt notification for transmission to connected devices. Interface 2100C illustrates the interface after transmitting the seatbelt notification.

Returning to FIG. 20, existing cabin crew controls 2001 can include a computing device, such as a pre-existing or legacy system, that is equipped to send notifications pertaining to seatbelts (On/Off) and announcements in progress. Given that the existing crew application provides an interface for the notifications, the server can read from this notifications' interface, format the messages to a style that the middleware will recognize, and simply forward the notifications to the VR devices. Notifications can be used in the server with styles that correspond to the existing notifications definitions.

Individual modules in the middleware and server can be disabled when they are not relevant for this pre-existing crew control setup. For example, reporting communications about battery life or communications about other device status data that cannot be visualized in the existing UI can be disabled.

The VR server 2002 can include an event and messaging manager for handling the communication between server and client devices (crew devices, if any, and VR devices). The server can use Socket.IO and a REST API to communicate with the client devices.

The server can also have a configuration layer that allows customization of available notifications (automatic or UI triggered) on the specific airplane setup and can be configured from a configuration file or from a UI. The configuration can include parameters such as notification type (ON/OFF notifications, onetime notifications, timed notifications), text, language, and icons that appear on the VR device, automatic vs UI triggered notifications, etc.

The server can also include a database for the storage of notifications' configuration, notifications' history, device-seat pairing data, devices' status data, as well as a messaging manager for receiving notifications from external sources (e.g. avionics server for public announcements).

The VR device 2003 includes multiple components, including the middleware, the plugin, and the notification application, which are described at length in this disclosure. Additional features and example implementations are described below.

The middleware can communicate with the Server Application with Socket.IO and a REST API, depending on the type of data, and with the plugin that is integrated inside all the VR apps using, for example, Android Messenger or a different messenger on a different OS.

The Notifications manager of the middleware manages the incoming messages from the server and forwards them to the plugin and allows a VR application to explicitly ask for the latest notification received. When connecting to the server, the middleware can receive information about the names, type, and structure of the existing, as well as their current state (ON/OFF). This information can be written in a serialized file in the memory of the device, so that it can then be retrieved at any time, when the plugin requests this info. The notifications manager can check if notifications have been displayed and acknowledged by the user, manage the incoming messages from the VR device (e.g. user calls for assistance) and pass them through to the server. Additionally, the notifications manager is responsible for checking if the connection with the server is still alive. If not, the middleware can send an independent notification to the user (i.e. to the plugin) to remove the headset, until a connection is established again.

The device info manager sends device-related information to server (e.g. device ID, battery life, status of VR platform application [alive or crashed]).

The keep alive manager makes sure the VR platform application is running on the VR device. If the application has closed unexpectedly then the middleware re-launches it.

The middleware also handles other functionalities that are unrelated to the cabin crew system, such as the collection of analytics from user activity, custom variables for internal use (e.g. language selection), etc. Each component of the middleware can be enabled or disabled for the needs of the current VR setup, through a configuration file.

The VR plugin is a plugin that 3rd party developers integrate and use in their applications in order to ensure that their content is safe for consumption during the flight. In addition to the previously described functionality, the plugin is responsible for collecting usage analytics from the VR applications. The plugin can communicate with the middleware through a messenger program, such as android messenger.

When a new application is launched, the plugin can ask the middleware for information about the existing and ongoing notifications and the UI of the VR device can be updated respectively. The middleware can read a serialized file with the notification info and send back the instructions to the plugin. For example, if a notification is defined to appear permanently on the quick bar, the plugin will update the notification toolbar with the equivalent icon (active or inactive, depending on the stage), or if the pop-up application-type notification is currently "ON", then the plugin will immediately launch the application.

As discussed previously, the VR notification application is controlled by the plugin. If the system is implemented on the android OS, the plug-in can use an Android Intent to launch the notification app and to send the information about the type of the window (persistent or non-persistent).

The server application and middleware in the VR devices can establish a two-way asynchronous communication, ensuring a continuous status update using the Socket.IO library. Moreover, the VR devices can receive an initial information dataset on the notifications' configuration and current state (i.e. ON/OFF) through a one-time REST API call. The REST API can be used for specific defined queries, while Socket.IO can be used for status updates.

Server to Middleware Data: the server can send notification messages to all connected devices (or a group of pre-selected connected devices, or individual devices) every time that the server receives an automatic or UI triggered notification update. The server can also send a one-time info update about the notifications' configuration (i.e. notification type) and current state (i.e. ON/OFF), upon request (REST API) when the middleware first connects to the server. This is useful in the situation when a device connects to the server during an ongoing notification (e.g. during a PA). This way, on starting the VR experience, the plugin will be able to show any ongoing notification (notification on "ON" mode) even after the server broadcasted the "ON" event to all previously connected devices. Moreover, this is useful for setting up and rendering any permanent notifications on the quick bar.

Middleware to Server Data: the middleware can send the VR device status as updates to the server on a regular basis. The update information can include device battery state, VR application state (running/crashed), as well as potential VR user requests for assistance (REST API).

The communication of the middleware with the plugin can done through defined communication methods. If the system is implemented in Android, then this can be done over Android Messenger protocol, using a custom-made Unity Bridge interface module, implemented in the middleware side and distributed with the plugin.

The Unity Bridge includes all the logic responsible for binding the middleware service with every newly running VR application (i.e. when we want to open any VR app from the VR platform or move from a running VR app back to the VR platform). The binding is requested from the plugin side.

Moreover, the interface includes all the methods required on the plugin side to communicate with the middleware. The middleware components can include functions that are specially annotated as methods that can be exposed to the plugin. When the middleware first starts executing, it can look through the existing methods in all the modules and register the annotated ones to the interface. When a VR application (with the plugin) is bound to the middleware, the Unity Bridge can track this event and can inform the plugin of all the available/exposed methods. The plugin can then call any of these methods.

In sum, the Unity Bridge can expose methods that are used for binding, unbinding, and sending commands (through the exposed methods) from a running VR application to the middleware. With these methods the system can handle and maintain the communication between middleware and VR applications.

One or more of the above-described techniques can be implemented in or involve one or more special-purpose computer systems having computer-readable instructions loaded thereon that enable the computer system to implement the above-described techniques. FIG. 40 illustrates an example of a computing environment 4000, such as the computing environment of VR device, cabin crew device, and/or VR server. The computing environment 4000 is not intended to suggest any limitation as to scope of use or functionality of a described embodiment(s).

Figure 22:
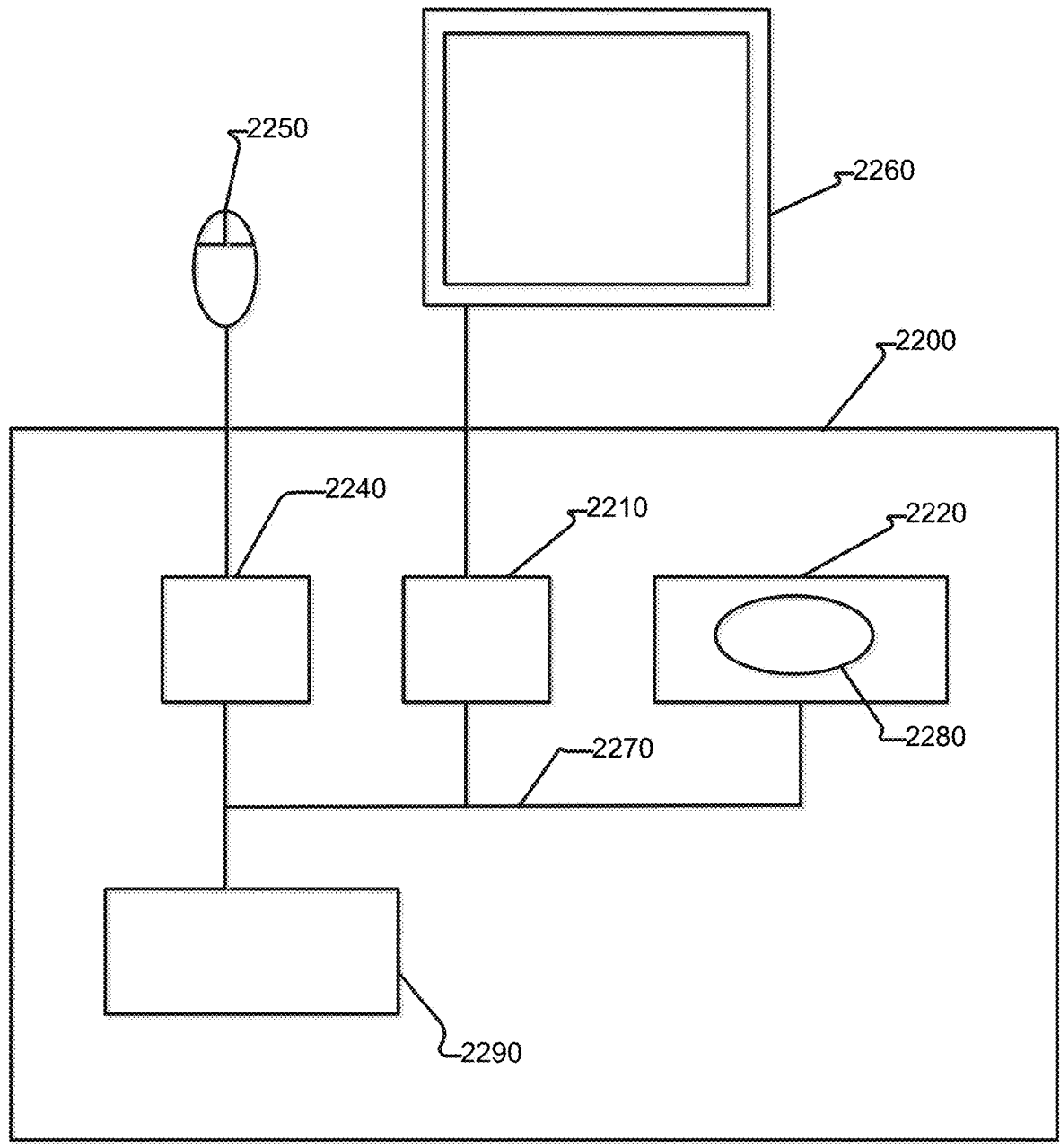
FIG. 22 illustrates exemplary computing environments that can be used to carry out the methods for managing notifications delivered to a virtual reality device.

With reference to FIG. 22, the computing environment 2200 includes at least one processing unit 2210 and memory 2220. The processing unit 2210 executes computer-executable instructions and can be a real or a virtual processor. In a multi-processing system, multiple processing units execute computer-executable instructions to increase processing power. The memory 2220 can be volatile memory (e.g., registers, cache, RAM), non-volatile memory (e.g., ROM, EEPROM, flash memory, etc.), or some combination of the two. The memory 2220 can store software 2280 implementing described techniques.

A computing environment can have additional features. For example, the computing environment 2200 includes storage 2240, one or more input devices 2250, one or more output devices 2260, and one or more communication connections 2290. An interconnection mechanism 2270, such as a bus, controller, or network interconnects the components of the computing environment 2200. Typically, operating system software or firmware (not shown) provides an operating environment for other software executing in the computing environment 2200, and coordinates activities of the components of the computing environment 2200.

The storage 2240 can be removable or non-removable, and includes magnetic disks, magnetic tapes or cassettes, CD-ROMs, CD-RWs, DVDs, or any other medium which can be used to store information and which can be accessed within the computing environment 2200. The storage 2240 can store instructions for the software 2280.

The input device(s) 2250 can be a touch input device such as a keyboard, mouse, pen, trackball, touch screen, or game controller, a voice input device, a scanning device, a digital camera, remote control, or another device that provides input to the computing environment 2200. The output device(s) 2260 can be a display, television, monitor, printer, speaker, or another device that provides output from the computing environment 2200.

The communication connection(s) 2290 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the context of computer-readable media. Computer-readable media are any available media that can be accessed within a computing environment. By way of example, and not limitation, within the computing environment 2200, computer-readable media include memory 2220, storage 2240, communication media, and combinations of any of the above.

Of course, FIG. 22 illustrates computing environment 2200, display device 2260, and input device 2250 as separate devices for ease of identification only. Computing environment 2200, display device 2260, and input device 2250 can be separate devices (e.g., a personal computer connected by wires to a monitor and mouse), can be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 2200 can be a set-top box, personal computer, or one or more servers, for example a farm of networked servers, a clustered server environment, or a cloud network of computing devices.

The present system offers many advantages. The VR notification system disclosed herein ensures the constant control and communication of the crew with the VR users. Maintaining situational awareness, especially on emergency situations, is one of the most important requirements of the aviation safety norms when it come on the use of inflight entertainment.

The VR notification system disclosed herein allows the crew to communicate with the immersed users in a fast, intuitive and secure way, considering all the current safety regulations.

The VR notification system architecture allows for a configurable solution depending on the requirements of each airline and the setup of the installed IFE system. For example, an airline can choose to have different announcements options depending on their policies. The design of the system also allows the airlines to select the importance of the notifications and choose the level of intrusiveness of the messaging in the VR experience, thereby optimizing the passenger experience.

Due to the modular architecture disclosed herein, airlines can integrate the preexisting cabin controls with controls of VR devices. Any changes can be implemented centrally on the server-side without requiring an update on the VR devices.

Moreover, the middleware service that is installed in the VR devices ensures that notifications are correctly received and displayed on the running VR applications and that no messages are lost during transmission, while in the case of any unexpected corruption on the communication with the crew, the middleware will ensure that the users remove their headsets.

Having described and illustrated the principles of our invention with reference to the described embodiment, it will be recognized that the described embodiment can be modified in arrangement and detail without departing from such principles. Elements of the described embodiment shown in software can be implemented in hardware and vice versa.

In view of the many possible embodiments to which the principles of our invention can be applied, we claim as our invention all such embodiments as can come within the scope and spirit of the following claims and equivalents thereto.

We claim:

1. A method for managing notifications delivered to a Virtual Reality (VR) device, the method comprising:
   receiving, by a middleware application executing on the VR device, a notification from a server, the notification comprising a notification identifier;
   transmitting, by the middleware application, the notification to a notification plugin integrated with an active application executing on the VR device and currently displayed in an environment rendered by the VR device;
   activating, by the notification plugin, a notification application on the VR device, the notification application being configured to disable all other applications on the VR device and to display a notification message corresponding to the notification identifier in the environment rendered by the VR device;
   receiving, by the middleware application, a second notification comprising a second notification identifier matching the notification identifier;
   deactivating, by the middleware application, the notification application based at least in part on receiving the second notification comprising the second notification identifier matching the notification identifier;
   executing, on the VR device, a toolbar application, the toolbar application being accessible to the notification plugin and being configured to transmit a persistent user interface element in the environment rendered by the VR device, the persistent user interface element comprising an assistance icon;
   detecting, by the notification plugin, that a gaze location of the user wearing the VR device corresponds to a location of the assistance icon;
   generating, by the notification plugin, an assistance request, the assistance request comprising a device identifier of the VR device;
   transmitting, by the notification plugin, the assistance request to the middleware application; and
   transmitting, by the middleware application, the assistance request to the server, the assistance request being configured to cause the server to identify a seat corresponding to the device identifier, identify a crew member corresponding to the identified seat, and transmit the assistance request to a crew member computing device associated with the crew member.

2. The method of claim 1, wherein transmitting, by the middleware application, the notification to a notification plugin integrated with an active application executing on the VR device and currently displayed on a display of the VR device comprises:
   storing, by a middleware application, a notification status corresponding to the notification;
   transmitting, by the middleware application, the notification to the notification plugin integrated with the active application;
   receiving, by the middleware application, an acknowledgement from the notification plugin integrated with active application in response to receipt of the notification; and
   updating, by the middleware application, the notification status.

3. The method of claim 1, wherein the notification comprises a persistent notification or wherein activating, by the notification plugin, a notification application on the VR device comprises:
   activating the notification application in a persistent mode, wherein the persistent mode of the notification application is configured to deactivate upon the notification plugin receiving a second persistent notification comprising a second notification identifier matching the notification identifier.

4. The method of claim 1, further comprising:
   deactivating, by the middleware application, the notification application based at least in part on detecting, by the notification application, a user acknowledgement of the notification message, wherein detecting, by the notification application, a user acknowledgement of the notification message comprises:
   transmitting, by the notification application, an acknowledgment message at an acknowledgment location within the environment rendered by the VR device; and
   detecting, by the notification application, that a gaze location of the user wearing the VR device corresponds to the acknowledgment location.

5. The method of claim 1, wherein the notification corresponds to an intrusiveness level and wherein displaying a notification message corresponding to the notification identifier in the environment rendered by the VR device comprises:
   identifying one or more settings corresponding to the intrusiveness level; and
   rendering the notification message in the environment based at least in part on the one or more settings.

6. The method of claim 1, wherein the persistent user interface element further comprises one or more of a seatbelt icon, a meal icon, a lavatory icon, and a purchase icon.

7. The method of claim 6, further comprising:
transmitting, by the by the notification plugin, one or more commands to the toolbar application based at least in part on the notification, the one or more commands being configured to alter one or more display characteristics of an icon in the persistent user interface element.

8. A Virtual Reality (VR) device for managing notifications, the VR device comprising:
one or more processors; and
one or more memories operatively coupled to at least one of the one or more processors and having instructions stored thereon that, when executed by at least one of the one or more processors, cause at least one of the one or more processors to:
receive, by a middleware application executing on the VR device, a notification from a server, the notification comprising a notification identifier;
transmit, by the middleware application, the notification to a notification plugin integrated with an active application executing on the VR device and currently displayed in an environment rendered by the VR device;
activate, by the notification plugin, a notification application on the VR device, the notification application being configured to disable all other applications on the VR device and to display a notification message corresponding to the notification identifier in the environment rendered by the VR device;
receive, by the middleware application, a second notification comprising a second notification identifier matching the notification identifier;
deactivate, by the middleware application, the notification application based at least in part on receiving the second notification comprising the second notification identifier matching the notification identifier;
execute, on the VR device, a toolbar application, the toolbar application being accessible to the notification plugin and being configured to transmit a persistent user interface element in the environment rendered by the VR device, the persistent user interface element comprising an assistance icon;
detect, by the notification plugin, that a gaze location of the user wearing the VR device corresponds to a location of the assistance icon;
generate, by the notification plugin, an assistance request, the assistance request comprising a device identifier of the VR device;
transmit, by the notification plugin, the assistance request to the middleware application; and
transmit, by the middleware application, the assistance request to the server, the assistance request being configured to cause the server to identify a seat corresponding to the device identifier, identify a crew member corresponding to the identified seat, and transmit the assistance request to a crew member computing device associated with the crew member.

9. The VR device of claim 8, wherein the instructions that, when executed by at least one of the one or more processors, cause at least one of the one or more processors to transmit, by the middleware application, the notification to a notification plugin integrated with an active application executing on the VR device and currently displayed on a display of the VR device further cause at least one of the one or more processors to:
store, by a middleware application, a notification status corresponding to the notification;
transmit, by the middleware application, the notification to the notification plugin integrated with the active application;
receive, by the middleware application, an acknowledgement from the notification plugin integrated with active application in response to receipt of the notification; and
update, by the middleware application, the notification status.

10. The VR device of claim 8, wherein the notification comprises a persistent notification and wherein the instructions that, when executed by at least one of the one or more processors, cause at least one of the one or more processors to activate, by the notification plugin, a notification application on the VR device further cause at least one of the one or more processors to:
activate the notification application in a persistent mode, wherein the persistent mode of the notification application is configured to deactivate upon the notification plugin receiving a second persistent notification comprising a second notification identifier matching the notification identifier.

11. The VR device of claim 8, wherein at least one of the one or more memories has further instructions stored thereon that, when executed by at least one of the one or more processors, cause at least one of the one or more processors to:
deactivate, by the middleware application, the notification application based at least in part on detecting, by the notification application, a user acknowledgement of the notification message, wherein the instructions that, when executed by at least one of the one or more processors, cause at least one of the one or more processors to detect, by the notification application, a user acknowledgement of the notification message further cause at least one of the one or more processors to:
transmit, by the notification application, an acknowledgment message at an acknowledgment location within the environment rendered by the VR device; and
detect, by the notification application, that a gaze location of the user wearing the VR device corresponds to the acknowledgment location.

12. The VR device of claim 8, wherein the notification corresponds to an intrusiveness level and wherein the instructions that, when executed by at least one of the one or more processors, cause at least one of the one or more processors to display a notification message corresponding to the notification identifier in the environment rendered by the VR device further cause at least one of the one or more processors to:
identify one or more settings corresponding to the intrusiveness level; and
render the notification message in the environment based at least in part on the one or more settings.

13. The VR device of claim 8, wherein the persistent user interface element further comprises one or more of a seatbelt icon, a meal icon, a lavatory icon, and a purchase icon.

14. The VR device of claim 13, wherein at least one of the one or more memories has further instructions stored thereon that, when executed by at least one of the one or more processors, cause at least one of the one or more processors to:

transmit, by the by the notification plugin, one or more commands to the toolbar application based at least in part on the notification, the one or more commands being configured to alter one or more display characteristics of an icon in the persistent user interface element.

15. At least one non-transitory computer-readable medium storing computer-readable instructions that, when executed a Virtual Reality (VR) device, cause the VR device to:

receive, by a middleware application executing on the VR device, a notification from a server, the notification comprising a notification identifier;

transmit, by the middleware application, the notification to a notification plugin integrated with an active application executing on the VR device and currently displayed in an environment rendered by the VR device;

activate, by the notification plugin, a notification application on the VR device, the notification application being configured to disable all other applications on the VR device and to display a notification message corresponding to the notification identifier in the environment rendered by the VR device;

receive, by the middleware application, a second notification comprising a second notification identifier matching the notification identifier;

deactivate, by the middleware application, the notification application based at least in part on receiving the second notification comprising the second notification identifier matching the notification identifier;

execute, on the VR device, a toolbar application, the toolbar application being accessible to the notification plugin and being configured to transmit a persistent user interface element in the environment rendered by the VR device, the persistent user interface element comprising an assistance icon;

detect, by the notification plugin, that a gaze location of the user wearing the VR device corresponds to a location of the assistance icon;

generate, by the notification plugin, an assistance request, the assistance request comprising a device identifier of the VR device;

transmit, by the notification plugin, the assistance request to the middleware application; and transmit, by the middleware application, the assistance request to the server, the assistance request being configured to cause the server to identify a seat corresponding to the device identifier, identify a crew member corresponding to the identified seat, and transmit the assistance request to a crew member computing device associated with the crew member.

16. The at least one non-transitory computer-readable medium of claim 15, wherein the instructions that, when executed by the VR device, cause the VR device to transmit, by the middleware application, the notification to a notification plugin integrated with an active application executing on the VR device and currently displayed on a display of the VR device further cause the VR device to:

store, by a middleware application, a notification status corresponding to the notification;

transmit, by the middleware application, the notification to the notification plugin integrated with the active application;

receive, by the middleware application, an acknowledgement from the notification plugin integrated with active application in response to receipt of the notification; and update, by the middleware application, the notification status.

17. The at least one non-transitory computer-readable medium of claim 15, wherein the notification comprises a persistent notification and wherein the instructions that, when executed by the VR device, cause the VR device to activate, by the notification plugin, a notification application on the VR device further cause the VR device to:

activate the notification application in a persistent mode, wherein the persistent mode of the notification application is configured to deactivate upon the notification plugin receiving a second persistent notification comprising a second notification identifier matching the notification identifier.

18. The at least one non-transitory computer-readable medium of claim 15, wherein at least one of the one or more memories has further instructions stored thereon that, when executed by the VR device, cause the VR device to:

deactivate, by the middleware application, the notification application based at least in part on detecting, by the notification application, a user acknowledgement of the notification message, wherein the instructions that, when executed by the VR device, cause the VR device to detect, by the notification application, a user acknowledgement of the notification message further cause the VR device to:

transmit, by the notification application, an acknowledgment message at an acknowledgment location within the environment rendered by the VR device; and detect, by the notification application, that a gaze location of the user wearing the VR device corresponds to the acknowledgment location.

19. The at least one non-transitory computer-readable medium of claim 15, wherein the notification corresponds to an intrusiveness level and wherein the instructions that, when executed by the VR device, cause the VR device to display a notification message corresponding to the notification identifier in the environment rendered by the VR device further cause the VR device to:

identify one or more settings corresponding to the intrusiveness level; and render the notification message in the environment based at least in part on the one or more settings.

20. The at least one non-transitory computer-readable medium of claim 15, wherein the persistent user interface element further comprises one or more of a seatbelt icon, a meal icon, a lavatory icon, and a purchase icon.

21. The at least one non-transitory computer-readable medium of claim 20, wherein at least one of the one or more memories has further instructions stored thereon that, when executed by the VR device, cause the VR device to:

transmit, by the by the notification plugin, one or more commands to the toolbar application based at least in part on the notification, the one or more commands being configured to alter one or more display characteristics of an icon in the persistent user interface element.

* * * * *